US012387699B1

(12) United States Patent
Savona

(10) Patent No.: US 12,387,699 B1
(45) **Date of Patent: *Aug. 12, 2025**

(54) BASS CAJON AND PORTABLE DRUM KIT SYSTEM INCORPORATING SAME

(71) Applicant: Richard M. Savona, Newark, DE (US)

(72) Inventor: Richard M. Savona, Newark, DE (US)

( * ) Notice: Subject to any disclaimer, the term of this patent is extended or adjusted under 35 U.S.C. 154(b) by 829 days.

This patent is subject to a terminal disclaimer.

(21) Appl. No.: 17/687,836

(22) Filed: Mar. 7, 2022

Related U.S. Application Data

(63) Continuation-in-part of application No. 16/586,959, filed on Sep. 28, 2019, now Pat. No. 11,270,676.

(60) Provisional application No. 63/234,686, filed on Aug. 18, 2021, provisional application No. 62/854,589, filed on May 30, 2019, provisional application No. 62/738,321, filed on Sep. 28, 2018.

(51) Int. Cl.
*G10D 13/02* (2020.01)
*G10D 13/10* (2020.01)
*G10D 13/18* (2020.01)

(52) U.S. Cl.
CPC ............. *G10D 13/02* (2013.01); *G10D 13/18* (2020.02); *G10D 13/28* (2020.02)

(58) Field of Classification Search
CPC ......... G10D 13/02; G10D 13/28; G10D 13/18
USPC ............................................................ 84/412
See application file for complete search history.

(56) References Cited

U.S. PATENT DOCUMENTS 2,893,283 A 7/1959 Ippolito
3,326,084 A 6/1967 Osty et al.
3,433,115 A 3/1969 Kjelstrom
4,593,596 A 6/1986 Gauger
6,211,448 B1 4/2001 Shigenaga et al.
7,608,769 B2 * 10/2009 Izen ........................ G10D 13/02 84/411 R
7,928,302 B2 4/2011 Sandson
9,449,588 B2 * 9/2016 Verderosa ................ G10G 5/00
9,792,887 B2 * 10/2017 Pinelli .................... G10D 13/02
9,972,293 B1 5/2018 Keller
10,013,960 B1 * 7/2018 Wish ...................... G10D 13/11
2019/0371285 A1 * 12/2019 Fowler ................... G10D 13/02

FOREIGN PATENT DOCUMENTS

FR 3026217 A1 * 3/2016 ............. G10D 13/02
WO 20140189369 A1 11/2014

* cited by examiner

*Primary Examiner* — Jianchun Qin

(74) *Attorney, Agent, or Firm* — Invention To Patent Services; Alex Hobson

(57) ABSTRACT

A portable drum kit system is configured to be converted from a transport configuration to a drumming configuration. The drum kit system includes a cajon with a plurality of drum components that is convertible from a storage container in a transport configuration to a cajon in a drumming configuration. The portable drum kit system is easy to transport, as all the components are coupled to, configured in or on, the convertible storage container that has a set of wheels and a handle. The portable drum kit eliminates the need for expensive and bulky drum covers, cymbal cases typically required for transportation of these components. The drum kit may include a snare drum, tom tom, hi-hat, cymbal and a tambourine. The cajon may be configured to produce only bass frequencies and may include high and mid tone sound absorbing material within the cajon.

20 Claims, 19 Drawing Sheets

BASS CAJON AND PORTABLE DRUM KIT SYSTEM INCORPORATING SAME

CROSS REFERENCE TO RELATED APPLICATIONS

This application is a continuation in part of U.S. application Ser. No. 16/586,959, filed on Sep. 28, 2019 and currently pending, which claims the benefit of priority to U.S. provisional patent No. 62/738,321 filed on Sep. 28, 2018, and to U.S. provisional patent No. 62/854,589 filed on May 30, 2019, and this application also claims the benefit of priority to U.S. provisional patent No. 63/234,686 filed on Aug. 18, 2021; the entirety of all applications are hereby incorporated by reference herein.

BACKGROUND OF THE INVENTION

Field of the Invention

The invention relates to a bass cajon and a portable drum kit system that is convertible from a transport configuration to a drumming configuration.

Background

A conventional drum set has a large number of components including a snare drum, one or more tom toms, cymbal, hi-hat, bass drum, a tambourine, a seat and the like. Traditionally, each of these components comprises a separate transport container which requires multiple trips to set up the drum set. Packing and unpacking a drum kit and setting it up can take a lot of time. A cajon is a percussion box or bass drum that is typically used while sitting on the cajon and beating on the face to create a bass sound. A traditional cajon produces bass and mid-range sounds such as sound having a frequency of 200 Hz or more, or 250 Hz or more, or 300 Hz or more. A cajon produces sound and when a drummer beats on the cajon with their hands, it prevents them from utilizing other drum components. There exists a need for a portable drum set that is easy to set up, can be packaged in a compact container for transport and provides enough drum components to provide authentic drumming sounds and authentic drumming experience.

SUMMARY OF THE INVENTION

The invention is directed to a portable drum kit system comprising a bass cajon and a method of converting said drum kit system from a transport configuration to a drumming configuration. An exemplary drum kit system comprises a cajon with a plurality of attachments for attachment of some of the drum components and a convertible storage container that converts to a seat when in a drumming configuration. An exemplary cajon is a bass cajon that produces sound frequencies of 300 Hz or less and preferably 250 Hz or less and even more preferably 200 Hz or less. The cajon has a sound opening to allow the sound to be emitted from the cajon. The exemplary portable drum kit system is easy to transport in one trip, as all the components are coupled to, configured in or on, the convertible storage container that has a set of wheels and a handle. The top of the convertible storage container may be used as a seat when the kit is configured in a drumming configuration and the lid of the convertible storage container may have a cushion for comfort. The cushion may be configured inward or toward the inside of the convertible storage container during transport and then flipped over when in a drumming configuration.

An exemplary portable drum kit system may comprise a plurality of drum components including, but not limited to, a snare drum, one or more tom toms, cymbal, hi-hat, bass drum such as a cajon, a tambourine and the like. A portion of these drum components may be configured inside of the convertible storage container and some may be retained to the exterior of the convertible storage container. In an exemplary embodiment, a portable drum kit system comprises a snare drum, tom tom, cymbal, hi-hat, cajon and a tambourine. In an exemplary embodiment, the snare drum, tom tom, cymbal and tambourine are attached to the cajon when in a drumming configuration and are stored inside of the convertible storage container when in a transport configuration. The hi-hat cymbals may be configured inside of the convertible storage container and the hi-hat stand may be retained in a sleeve or other retainer coupled to the convertible storage container during transport. Also, the hi-hat stand may be stored for transportation in the cajon and may extend up through a top sound opening in the cajon.

Drum components may be detachably attached to the cajon by attachments such as elongated rods that are configured to accept a clamp to attach the drum component. The elongated rod attachments may be bolted to the top of the cajon and may have threads or a rough exterior to further ensure a secure attachment of the drum component. In an exemplary embodiment, an attachment is a threaded bolt that is secured to the cajon, such as to the top wall, by bolts; one on the outside and one on the inside surface of the cajon wall. The bolts may be removed quickly and easily and stored in the convertible storage container. In another embodiment, an attachment comprises a receiver having an opening for the insertion of a drum component stand or attachment bracket. The receiver may be clamped closed or tighten down around the attachment bracket, such as a rod, of the drum component. The top of the polished bolt may be the shape of a tightscrew drum tension rod so that the drummer can do a quick turn, such as a ⅛ turn with a drumkey and lock the bolt in place so that it does not loosen as a result of vibrations. The bolt may be detached with a counter turn with a drumkey.

An exemplary portable drum kit system comprises a cajon pedal that is detachably attachable to the cajon, such as to the back wall of the cajon. A cajon pedal bracket may be secured to the cajon for attachment of the cajon pedal. This enables a drummer to use their foot to create a bass drum sound with the cajon and frees their hands to play the other drum components, like with a traditional drum set. An exemplary cajon pedal bracket has a cajon portion and a pedal portion that may be connected by a hinge to enable the bracket to be folded closed during transport. A magnet may be configured to secure the pedal portion against the cajon portion during transport.

An exemplary convertible storage container of a portable drum kit system comprises to top opening for receiving the drum components. The lid may be removed to expose the top opening and the lid may comprise a cushion that is faces inward during transport. The cushion may comprise a resilient deformable material, such as a foam or fabric, that secures the drum components in place and protects them during transport. An exemplary convertible storage container comprises a lower portion and an upper portion that is separated from the lower portion by a divider. An exemplary divider may be on a hinge or may be detachably attachable and sit on rails along the inside surface of the convertible storage container. A user of the system may load drum components in the lower portion and then configure the divider over the lower portion, such as by closing the divider by the hinge or inserting it onto the rails, and then insert additional drum components in the upper portion. An exemplary convertible storage container may comprise apertures in the divider and/or in the base to receive elongated members of the drum components, such as stands which typically comprise rods. A divider aperture may align with an aperture in the base or lid to secure an elongated member drum component, or stand component in place during transport. An exemplary convertible storage container may comprise one or more sleeves for retaining drum components such as stands or pedals, for example. In an exemplary embodiment a hi-hat stand is retained in a sleeve that is attached to the convertible storage container and the hi-hat cymbals are retained inside of the convertible storage container. Alternatively, the hi-hat stand is retained in the cajon and may extend out of a top sound opening. The cajon may be configured to rest on the top surface of the convertible storage container when in a transport configuration. A strap may be used to secure the cajon to the convertible storage container and may extend around the handle and/or under the convertible storage container.

In an exemplary embodiment, a cajon has a detachably attachable panel, such as the bottom panel, that is removed to enable the cajon to slid down over the convertible storage container in a transport configuration. In addition, a cajon may only have five sides and no bottom panel, as it may be placed on a flat surface to form the enclosure while in a drumming configuration. In still another embodiment, the cajon without a bottom panel or with a detachably attachable panel, such as a panel that opens or detaches, is the convertible storage container and a separate seat may be used while in a drumming configuration. A separate seat may be coupled to the convertible storage container or may be a separate item from the exemplary portable drum kit system.

An exemplary convertible storage container comprises a pair of wheels that are configured to engage with the ground when the convertible storage container is tilted. A user may use a handle, such as a retractable handle, coupled to the convertible storage container and tilt the convertible storage container to engage the wheels with the ground and transport the portable drum kit by rolling the entire kit on the wheel. The wheels may extend from the back or side of the convertible storage container.

An exemplary portable drum kit system can be converted from a transport configuration to a drumming configuration comprising by removing the plurality of drum components from the convertible storage container and attaching the plurality of drum components to the plurality of attachments on the cajon. The cajon may be a convertible cajon that has a detachable side, such as a side that opens to allow drum components as described herein to be placed into the cajon for transport or storage. The top or bottom of the cajon may open to enable components to be placed within the cajon to convert the cajon into a storage container. In an exemplary embodiment the lid of the convertible storage container has a seat side that faces into the convertible storage container when in a transport configuration and faces outward when in a drumming configuration. In an exemplary embodiment, the method further comprises flipping over the lid of the convertible storage container to configure the seat facing up. In an exemplary embodiment, the method of converting the portable drum kit comprises the step of attaching the cajon pedal to the cajon pedal bracket on the cajon.

An exemplary cajon of a portable drum kit system may have a sound opening on the front of the cajon and/or on the top of the cajon. A sound opening may be an aperture in panel of the cajon, such as a circular opening in the front panel of the cajon or an opening in the panel extending from the edge of the panel, such as an opening along the base or bottom of the front panel. The sound opening may extend a portion across the width of the front of the cajon, or completely across the front of the cajon from the left side to the right side. The sound opening may extend up from the bottom about 15% or less of the height of the cajon, about 25% or less of the height of the cajon, about 35% or less of the height of the cajon, about 40% or less of the height of the cajon and any range between and including the height of the sound opening provided. A sound opening cover may be placed over one of the sound openings according to a drummer's preference. A top sound opening emits sound from the top and enables the drummer to more effectively hear the sound produced by the cajon, which is important to drummers. A sound opening may be configured with a sonic enhancement port that amplifies and channels the bass frequencies. An exemplary sonic enhancement port is a "KickPort" available from KickPort as described in U.S. Pat. No. 7,582,820, to Millender, Jr, et al; the entirety of which is hereby incorporated by reference herein. Another exemplary sonic enhancement port is available from D'Addario and described in U.S. Pat. No. 7,074,992, to Schmidt; the entirety of which is hereby incorporated by reference herein.

In an exemplary embodiment, the front of the cajon is configured with a polymer panel that is translucent to allow light to pass through the polymer panel. A sound opening may be configured in the polymer panel and a sonic enhancement port may be configured in the sound opening. An exemplary polymer panel may be polycarbonate, polyester, polyethylene, Poly(methyl methacrylate) (PMMA), also known as acrylic, and the like. The polymer panel vibrates and produces a bass sound and may produce more sound than a conventional wood panel that extends along the front of the cajon. A sound opening, and in some embodiment a sonic enhancement port, may be configured in the bottom half of the cajon, offset from a center location along the height. The center point of the sound opening or sonic enhancement port may be below the center point of the height, or center height axis, or preferably, the entire sound opening or sonic enhancement port is configured below the center height axis, or in the bottom half of the cajon. This lower location may produce a deeper bass sound.

A polymer panel may be secured to the cajon by a plurality of fasteners and these fasteners may have fastener gaps, or distance between the fasteners to allow sound and air to exit between the polymer panel and the cajon. An exemplary fastener gap may be about 10 cm or more, about 12 cm or more, about 15 cm or more, about 20 cm or less, about 25 cm or less and any range between and including the fastener gaps provided. If the fastener gap is too small, air and sound may not be able to effectively escape between the fasteners and if the fastener gap is too larger, the polymer panel may not be held in enough tension to produce sound effectively. An exemplary polymer panel may have a thickness of about 4 mm or more, about 6 mm or more, about 8 mm or more, about 12 mm or more about 20 mm or more and any range between and including the thickness values provided. If the polymer panel is too thick and/or stiff, it may not vibrate enough to produce a desired bass sound from the cajon.

An exemplary cajon may have a batter panel configured along the back side of the cajon. A batter coupled to a cajon pedal may be manipulated by a drummer's foot to impact the batter on the back of the cajon or on the batter panel. The batter panel may be made out of wood, such as a sheet of wood or wood laminate and may have a thickness and stiffness to allow an effective amount of vibration to produce the vibrations in the interior of the cajon. A batter panel may have a thickness of about 4 mm or more, about 6 mm or more, about 8 mm or more, about 12 mm or more about 20 mm or more and any range between and including the thickness values provided. If the batter panel is too thick and/or stiff, it may not vibrate enough to produce a desired bass sound from the cajon.

An exemplary cajon has a batter panel configured along the back of the cajon and has a spacer gap produced by the spacers configured between the batter panel and the body of the cajon. This spacer gap allows the batter panel to vibrate when impacted by the batter. This additional vibration produces a richer and deeper bass sound. The spacers have a thickness of about 1 mm or more, about 2 mm or more, about 3 mm or more, about 4 mm or more, about 12 mm or less, about 2 mm to 8 mm and any other range between and including the thickness values listed. The spacers may be configured around the batter fasteners, or may be retained by a separate fastener. The batter fasteners may have a batter fastener gap distance, or distance between the fasteners, of about 10 cm or more, about 12 cm, about 15 cm or more, about 20 cm or less, about 25 cm or less and any range between and including the fastener gaps provided. If the fastener gap is too small, air and sound may not be able to effectively escape between the fasteners and if the fastener gap is too larger, the polymer panel may not be held in enough tension to produce sound effectively.

An exemplary cajon may be a bass cajon and produce lower bass frequencies, wherein the average sound frequency is 300 Hz or less, preferably 250 Hz or less and more preferably 200 Hz or less. In some embodiments, the average sound frequency is no more than 150 Hz. Put another way, a substantial portion of the sound produced by the cajon may be bass frequencies, wherein at least 90% of the sound produces has a frequency of 300 Hz or less, preferably 250 Hz or less and more preferably 200 Hz or less, and even more preferably 150 Hz or less. In an exemplary embodiment, the sound frequency is measured using a Spectrum Analyzer App, available on the App store. See http/SpectrumAnalyzerApp.com, for more details. The version available as of Sep. 28, 2019, or an equivalent, may be used to determine sound frequencies produced by a cajon.

An exemplary bass cajon may have sound absorbing material configured along inside surfaces of the cajon, such as along the top, bottom, sides, and back surfaces. The sound absorbing material may be configured to absorb mid-range and high frequency sounds, such as sound having a frequency of 200 Hz or more, or 250 Hz or more, or 300 Hz or more. The sound absorbing material may be porous and have a surface area and structure to absorb these sounds frequencies, and may be a textile, such as carpet or other fiber or yarn containing material, foam or honeycomb material. An exemplary sound absorbing material may be an open cell foam having a cell structure to capture and retain mid and high range sound frequencies.

An exemplary cajon may be made out of wood, such as maple or birch wood as they produce an effective sound. An exemplary cajon may be a rectangular box having a height of about, 30 cm or more about 40 cm or more, about 50 cm or more or about 75 cm or less and any range between and including the values provided.

An exemplary portable drum kit system may comprise a convertible cajon that is both a storage container and a cajon. The convertible cajon may have an interior within the cajon enclosure for the storage of other items including other items of the portable drum kit system as described herein, which may include, attachments, such as the snare drum attachment, tambourine attachment 92, tom tom attachment, and/or symbol attachment, the cajon pedal and batter the snare drum, tambourine, tom tom, cymbal or cymbal stand, or any other accessories or components described herein. The components may be stored within the enclosure of the cajon and the interior may comprise a divider that forms an upper compartment and a lower compartment of the enclosure. Note that the divider may be retained on or by brackets to enable the divider to be removed from the enclosure. The divider may be air permeable and may be a screen material, such as a metal or fabric or polymer screen, grate or netting material that enables air to pass therethrough, thereby not detracting from the sound the cajon produces. The components may be located in and retrieved from the interior of the cajon by opening a door or doors of the convertible cajon that may open by rotating about hinges. The doors are preferably on the top of the cajon enclosure buy may be configured on a side, front or back of the cajon. The doors enable quick access to the components stored therein. The access door may be detachably attachable to the convertible cajon. Also, the door or doors may open to substantially open a side, top, front or back of the convertible cajon, wherein at least 75% or more of that face (side, top, front or back) of the cajon is exposed or opened, and preferably 95% or more. This large access opening may be necessary to effectively load and unload drum components into the enclosure of the convertible cajon.

The convertible cajon is a transportable storage container having wheels that can engage with the ground when the cajon is tilted back toward the wheels, such as by the retractable handle. The retractable handle may be extended upward to provide better leverage for transporting the convertible cajon. The convertible cajon may also have other handles such as on the left and or right sides of the cajon enclosure to allow the cajon to be carried or moved by hand.

The convertible cajon is also a cajon having a sound opening, such as on the front and may comprise a sonic enhancement port which may be configured in the top. The cajon enclosure may be configured with a cajon pedal bracket for the attachment of a cajon pedal and batter. The convertible cajon may have all of the same attachments as described herein including, the snare drum attachment, tambourine attachment, tom tom attachment, and/or symbol attachment, for the respective attachment of the snare drum, tambourine, tom tom cymbal or cymbal stand 67. The convertible cajon may be played as described herein and may have a spacer and spacer gap for improved sound quality as described herein, as well as sound absorbing material and a light for enhanced effects.

The convertible cajon enables a single enclosure to substantially all of the components attached to the cajon, except for a large cymbal which may be too large for the enclosure.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
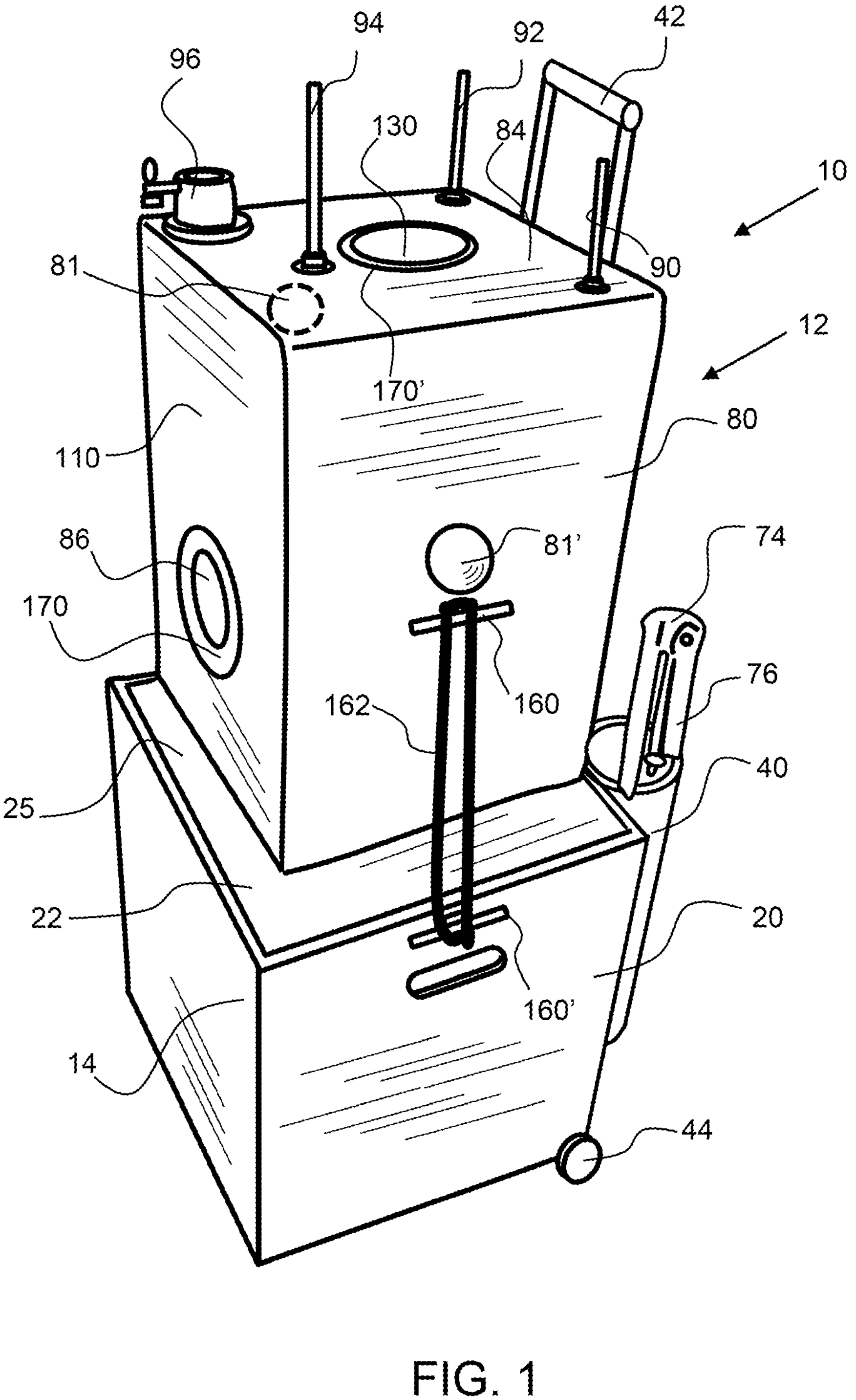
FIG. 1 shows an exemplary portable drum kit system in a transport configuration comprising a convertible storage container having wheels and a handle and a cajon with a plurality of drum component attached configured on top of the convertible storage container.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Definitions

A cajon is a box-shaped percussion instrument that produces a bass drum sound from a sound outlet opening that is typically circular in shape and located on one of the sides, such as the front side. A cajon is typically played by sitting on the cajon and beating or slapping one of the side panels with your hands or hands. An exemplary cajon is a rectangular box having planar sides including a front, back, two opposing sides, top and bottom and is typically made of wood panels. A cajon may have a detachable bottom panel and the cajon may be configured to slide down over the convertible storage container during transport. The cajon may be pull up off of the convertible storage container and the bottom panel may then be attached. It may be possible to use a cajon without a bottom panel as well.

A tom-tom drum is a cylindrical percussion instrument, a drum with no snares. Tom-toms range in size between 6 and 20 inches (15 and 51 cm) in diameter, though floor toms can go as large as 24 inches (61 cm).

A snare drum or side drum is a percussion instrument that produces a sharp staccato sound when the head is struck with a drum stick. A snare drum has a series of stiff wires that are held under tension against the lower skin. A snare drum is a central piece in a drum set. Snare drums are usually played with drum sticks, but other beaters such as the brush, thunderrods and the like can be used to achieve very different sounds.

A hi-hat comprises two cymbals and a foot-operated pedal that moves a rod coupled with one of the cymbals. Hi-hats are typically included in a standard drum set or kit. A hi-hat has a pair of mating cymbals, small to medium-sized cymbals, mounted on a stand, with the two cymbals facing each other. The bottom cymbal is fixed and the top is mounted on a rod which moves the top cymbal towards the bottom one when a foot pedal is depressed (a hi-hat that is in this position is said to be "closed" or "closed hi-hats").

A crash cymbal is a type of cymbal that produces a loud, sharp "crash". They can be mounted on a stand and played with a drum stick, or by hand in pairs. One or two crash cymbals are a standard part of a drum kit or set. An exemplary crash cymbal may range in thickness from paper-thin to very heavy, but have a fairly thin edge. An exemplary crash cymbal is typically 14 to 18 inches (36 to 46 cm) in diameter, but sizes down to 8 inches (20 cm) and up to 24 inches (61 cm) are manufactured.

The ride cymbal is a standard cymbal in most drum kits or sets and is typically used to produce a steady rhythmic pattern, sometimes called a ride pattern.

A splash cymbal is typically the smallest accent symbol in a drum kit or set. Splash cymbals and china cymbals are the main types of effects cymbals. An exemplary splash cymbal has a diameter from 6 inches to about 13 inches but may be as small as 4 inches in diameter.

A China-type cymbals are a distinct type of crash cymbals that produces a bright, crisp, and explosive tone. A China-cymbal is frequently mounted upside down on cymbal stands, allowing for them to be more easily struck and for a better sound.

A cymbal, as used herein, may be any of the cymbals as defined above.

A Tambourine is a percussion musical instrument having a frame, often of wood or plastic and a plurality of pairs of small metal jingles, called "zills". A tambourine is typically configured on an arced shaped frame and can be played by hand or by striking the frame with a drum stick or another implement.

As shown in FIG. 1, an exemplary portable drum kit system 10 is configured in a transport configuration with a cajon 80 configured on top 22 of the convertible storage container 20. The portable drum kit 12 is easily transported from one location to another and comprise a convertible storage container that retains a plurality of drum components 14 therein. The convertible storage container has wheels 44 and a handle 42 that enable the portable drum kit to be rolled from one place to another. A user may tilt the convertible storage container with the handle 42 to engage the wheels. The cajon has a plurality of attachments on the top for attachment of drum components. A hi-hat stand 74 and hi-hat pedal 76 are configured in a sleeve 40 coupled to the convertible storage container 20. There are a number of attachments on the top of the cajon 80 including, a snare drum attachment 90, a tambourine attachment 92, a tom tom attachment 94 and a cymbal attachment 96. As shown in FIG. 1, the cajon may comprise one or more lights 81, 81' that are configured to illuminate and may illuminate or change intensity with the beat of the cajon. An exemplary light 81' may be configured on the outside of the cajon, such as along the front wall, one or both side walls, on the top wall or inside of the cajon, such as light 81. A top sound opening 130 is configured in the top 84 of the and may enable the drummer to hear the bass sound produced by the cajon 80. A cajon may have a front wall sound opening 86 and/or a top sound opening 130. As shown in FIG. 1, cleats 160 and 160' provide support for a strap 162 to secure the cajon 80 to the convertible storage container 20. The convertible storage container 20 may comprise a handle 120, which may extend out from the convertible storage container or be an aperture in the convertible storage container.

Figure 2:
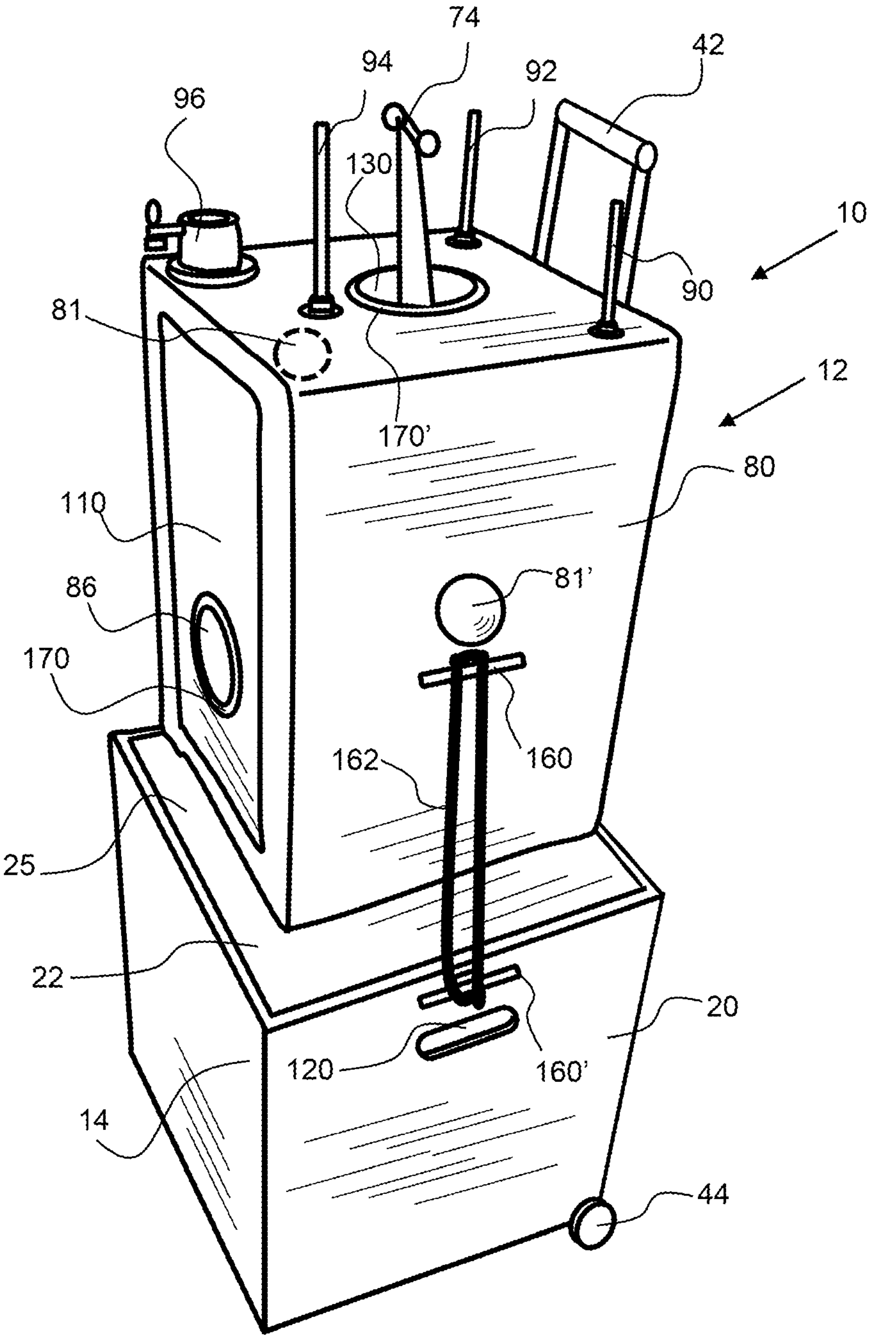
FIG. 2 shows an exemplary portable drum kit system in a transport configuration with the hi-hat stand stored in the top sound opening.

As shown in FIG. 2, the hi-hat stand 74 is retained in the top sound opening 130. When the cajon 80 is configured with a top sound opening, the sleeve 40 for the hi-hat stand, as shown in FIG. 1, may not be required. As shown in FIG. 2, a polymer panel 110 is configured along the front of the cajon. The polymer panel may produce a desired bass sound when it vibrates and it may be translucent or transparent to allow an audience to see through the panel and to see light effects from a light 81 configured in the interior of the cajon. As shown in FIGS. 1 and 2 a sonic enhancement port 170, 170' may be configured in the front sound opening 86 and top sound opening 130, respectively. Note that a cajon may be configured with only one of the sound openings shown, such as on the front of the cajon or on the top of the cajon.

Figure 3:
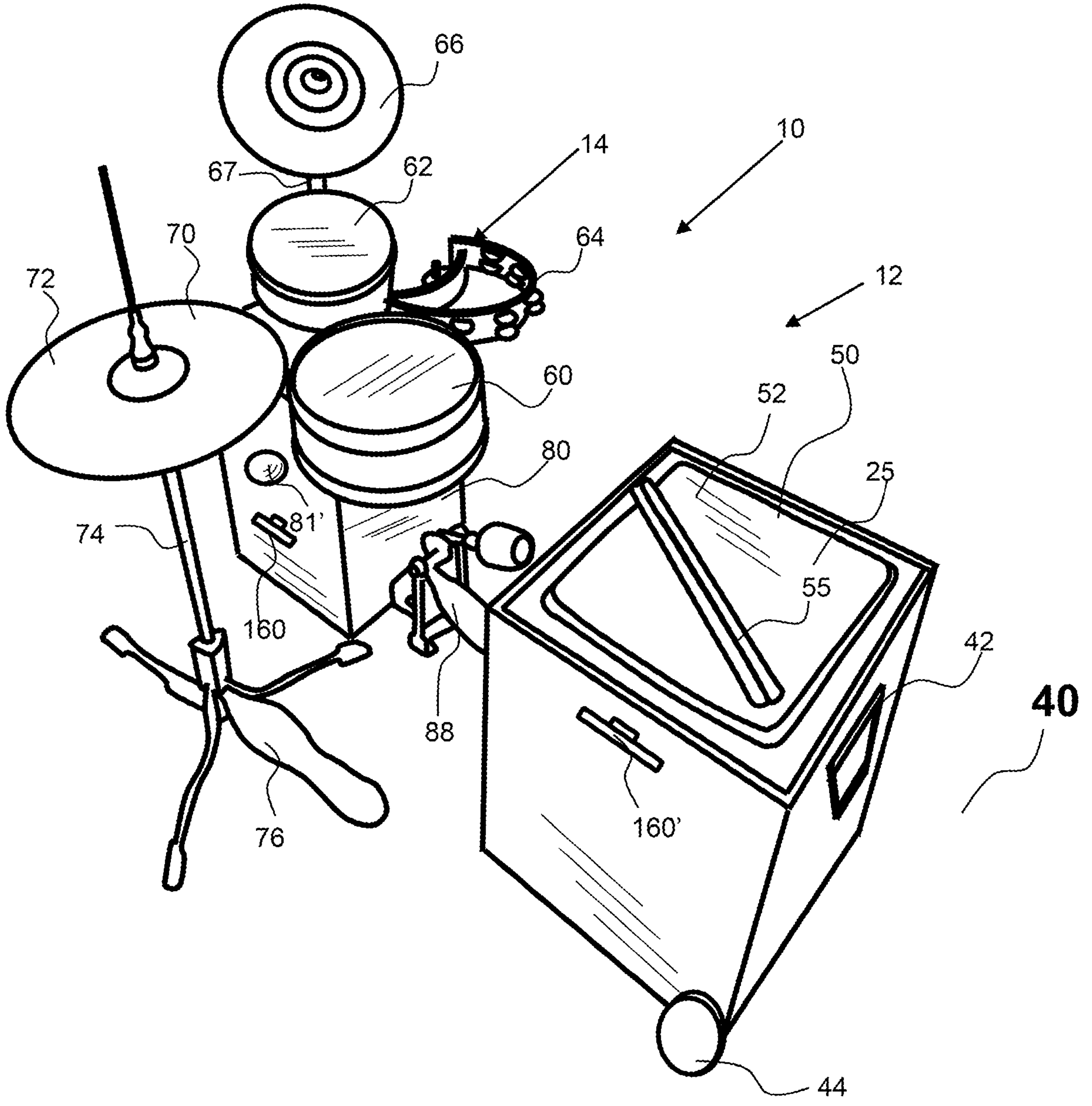
FIGS. 3 and 4 show an exemplary portable drum kit system in a drumming configuration comprising a convertible storage container with a seat, a plurality of drum components attached to the cajon and a hi-hat cymbal and stand.
Figure 4:
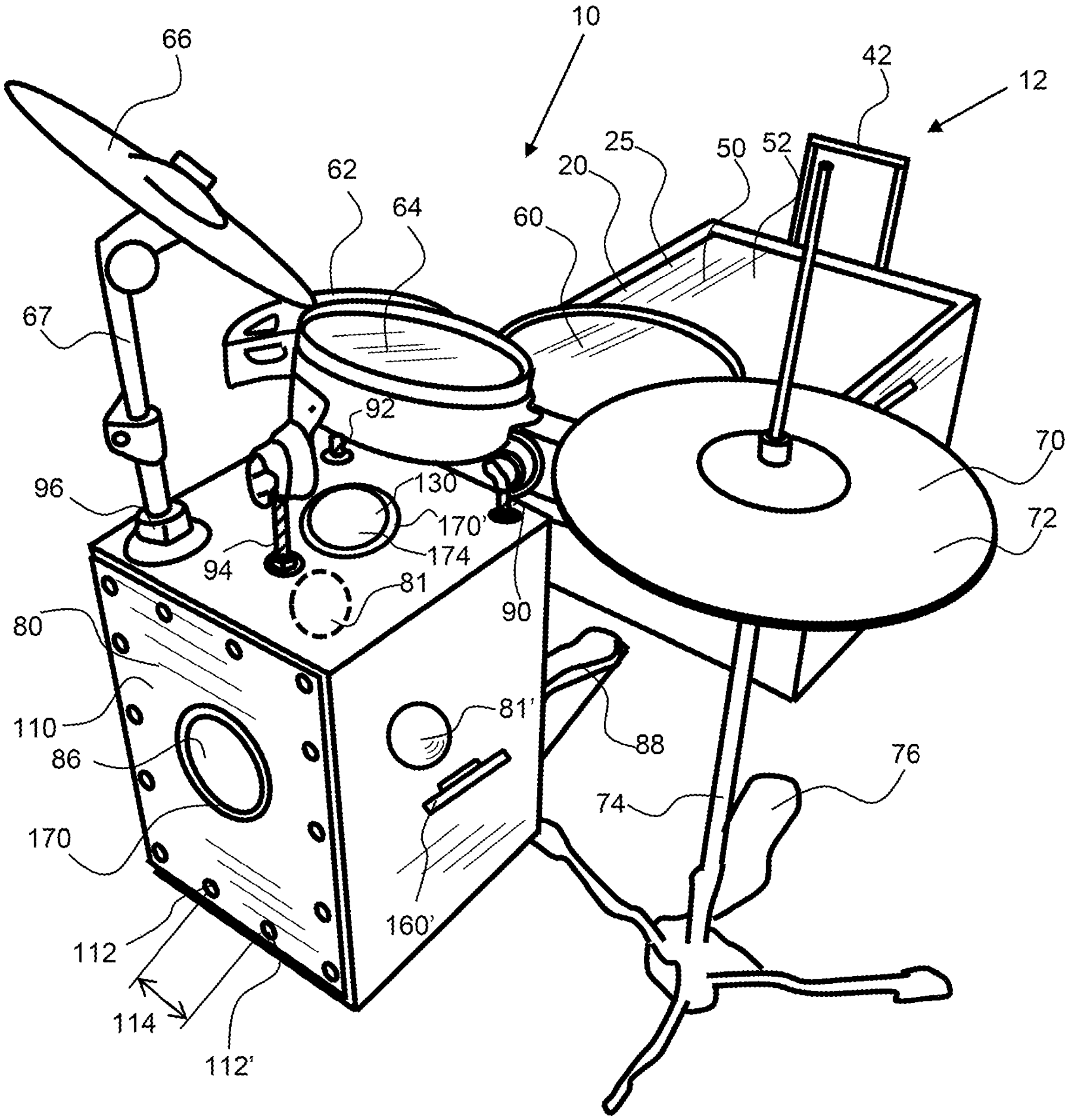

Referring now to FIGS. 3 and 4, an exemplary portable drum kit system 10 is configured in a drumming configuration with the plurality of drum components 14, removed from the convertible storage container 20 and attached to the attachments of the cajon 80. As best shown in FIG. 4, the snare drum 60 is attached to the snare drum attachment 90, the tom tom 64 is attached to the tom tom attachment 94, the tambourine 62 is attached to the tambourine attachment 92 and the cymbal 66 is attached to the cymbal attachment 96. The convertible storage container 20 is now converted to a seat, with the lid 25 flipped upside down to expose the seat 50 having a cushion 52. The cajon pedal 88 is attached to the cajon and a hi-hat 70 is set up to complete the exemplary portable drum set. The cajon 80 has a sound opening 86 on the front of the cajon through a polymer panel 110. The polymer panel 110 on the front of the cajon is secured by fasteners 112 having a fastener gap 114, or distance between the fasteners. A sound opening cover 174 is configured in the top sound opening 130 on the top of the cajon. The hi-hat comprises two hi-hat cymbals 72, a stand 74 and hi-hat pedal 76. As shown in FIG. 4, the cajon is configured with a top sound opening 130; not visible in FIG. 3. Sonic enhancement ports 170, 170' are configured in the sound openings 86, 130, respectively.

Figure 5:
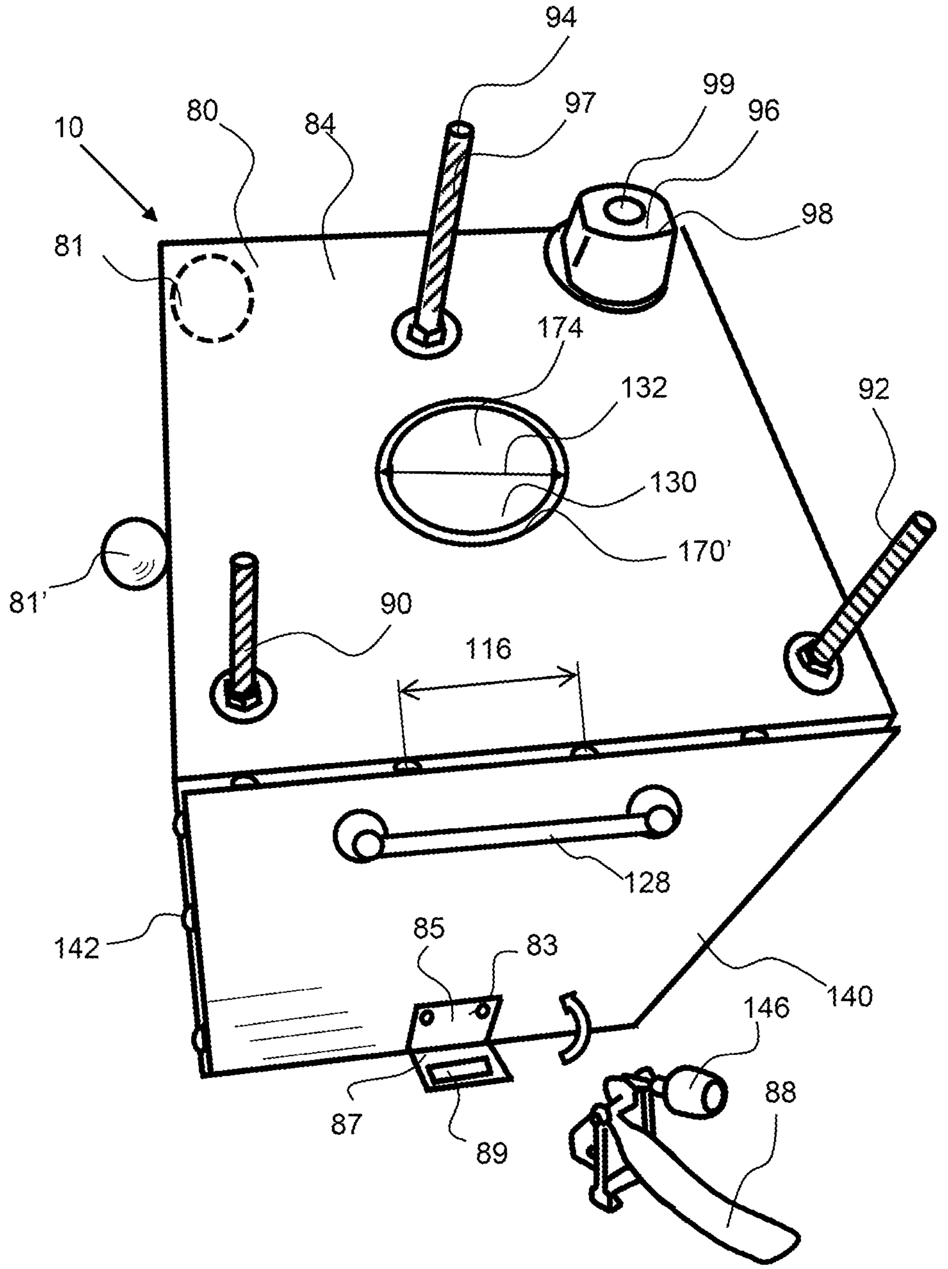
FIG. 5 shows a perspective view of an exemplary cajon having a plurality of attachments for drum components, a top sound opening and a batter panel that is offset a spacer gap distance by spacers.

As shown in FIG. 5, the top 84 of the cajon 80 has a plurality of attachments, such as a bolt type attachment 97 or a receiver attachment 98, comprising an opening 99 to receive a stand for a drum component. A top sound opening 130 is also configured in the top 84 of the cajon and has a diameter 132 that may be between 75 mm to 125 mm (3" to 5"). A drum component or stand component thereof may be detachably attached to the attachment and positioned according a drummer's preference. In an exemplary embodiment, the attachments include a snare drum attachment 90, a tambourine attachment 92, a tom tom attachment 94 and a cymbal attachment 96. As shown in FIG. 5, a cajon pedal bracket 83 is attached to the outside of the back wall of the cajon. The exemplary cajon pedal bracket comprises a cajon portion 85 and a pedal portion 87 and may be configured as a hinge that can rotate closed during transport and rotate open, as shown, for attachment of the cajon pedal 88. An exemplary cajon pedal bracket 83 may comprise a magnet 89 to secure the bracket in a closed position during transport. A cajon handle 128 is configured on the back side of the cajon. Also, a batter panel 140 is offset a batter spacer gap distance by spacers 142 configured between the batter panel and the cajon. This spacer gap enables the batter panel to vibrate more freely and produce more bass sound when impacted by the batter 146. The spacers may be configured with the batter fasteners 147 that secure the batter panel 140 to the cajon 80 and the batter fastener gap distance 116, or distance between the adjacent fasteners is shown and may be about 10 cm or more, about 12 cm, about 15 cm or more, about 20 cm or less, about 25 cm or less and any range between and including the fastener gaps provided.

Figure 6:
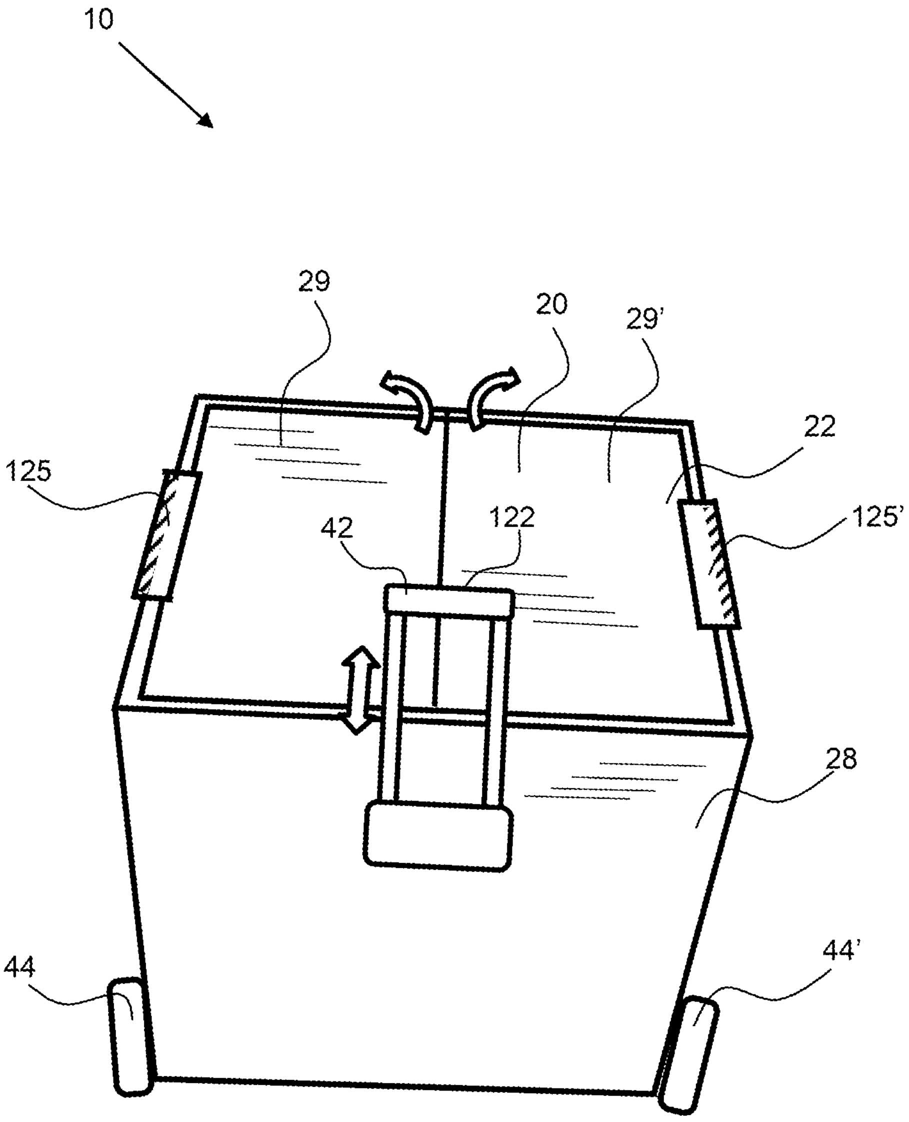
FIG. 6 shows a perspective view of an exemplary convertible storage container having wheels, a retractable handle and two top doors to provide access into the convertible storage container.

As shown in FIG. 6, an exemplary convertible storage container 20 has wheels 44 configured on the sides and configured up from the floor or base of the convertible storage container when sitting on a surface. The wheels will only engage the ground when the convertible storage container is tilted by the handle 42 back, or towards the back side 28. The exemplary lid 25 of the convertible storage container comprises doors 29, 29' that are coupled to the convertible storage container 20 by hinges 125, 125'. Also, the two doors 29, 29' are configured to swing open to allow access to the interior of the convertible storage container and hinges 125, 125' enable the opening of the doors. A retractable handle 122 is configured on the back of the convertible storage container 20 wherein the handle extends up and down from a bracket attached to the convertible storage container 20.

Figure 7:
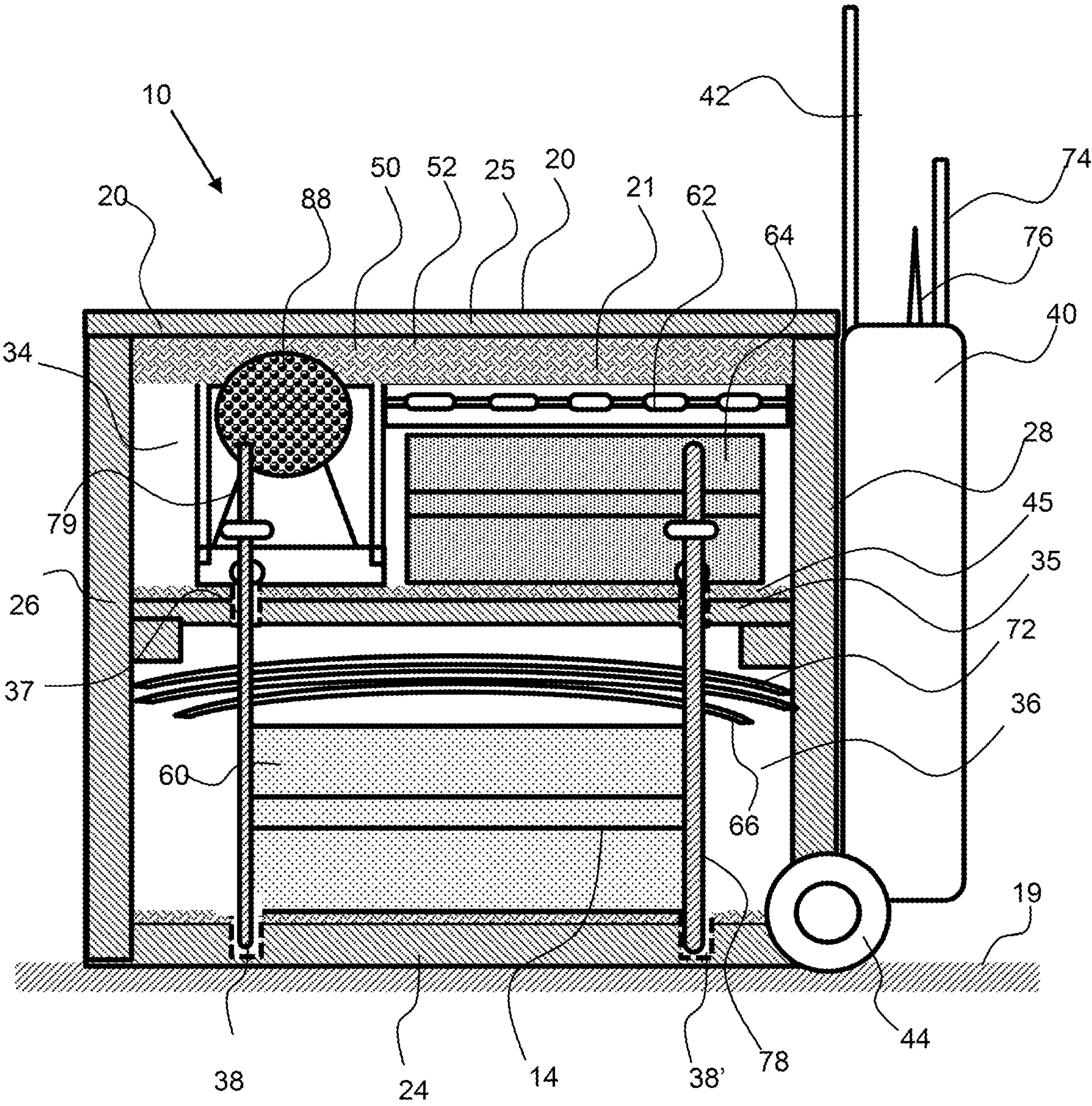
FIG. 7 shows a cross-sectional view of an exemplary convertible storage container with exemplary drum components configured therein.

As shown in FIG. 7, an exemplary convertible storage container 20 has a plurality of drum components 14 configured therein. In an exemplary embodiment, a snare drum 60, cymbal 66 and hi-hat cymbals 72 are configured in a lower portion 36 of the convertible storage container, a divider 35 divides the lower portion from an upper portion 34. The divider 35 may have a non-slip material 45 on the top surface to prevent drum components retained thereon from sliding. A non-slip material may be carpet, an elastomer material, foam and the like. In the upper portion, the tom tom 64, tambourine 62 and cajon pedal 88 are retained. The hi-hat rod 78 and cymbal rod 79 are configured through apertures 37 in the divider and may be retained in recess 38 in the base 24 of the convertible storage container. The lid 25 is configured with the seat 50 and seat cushion 52 facing into the interior of the container. The hi-hat stand 74 and hi-hat pedal 76 are retained in the sleeve 40. The wheels 44 are configured parallel with or above the ground level 19.

Figure 8:
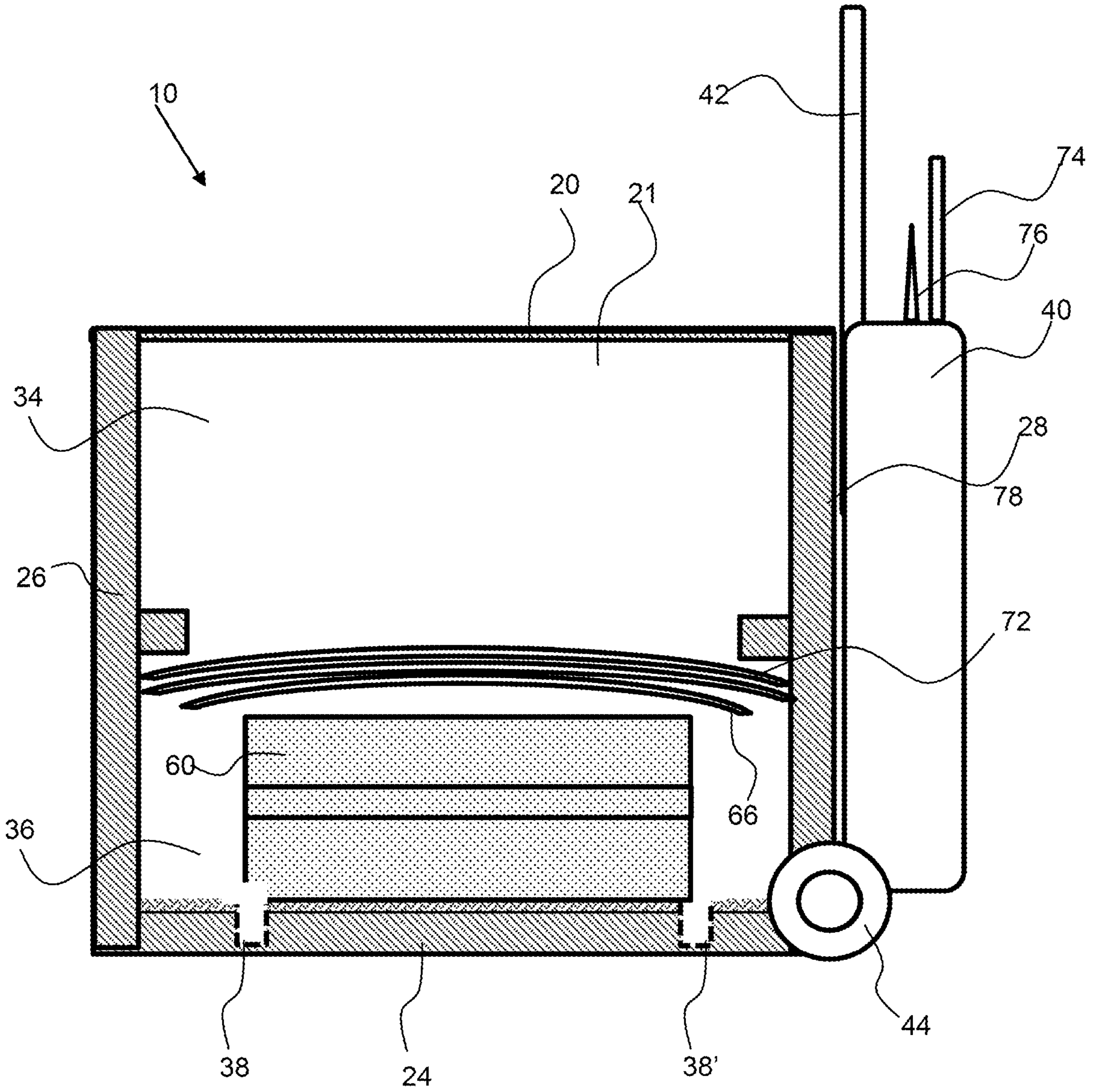
FIGS. 8 to 10 show cross-sectional views of an exemplary convertible storage container with exemplary drum components configured therein.

As shown in FIG. 8, the snare drum 60, cymbal 66 and hi-hat cymbals 72 are configured in the lower portion 36 of the exemplary convertible storage container 20. The snare drum and cymbals may be placed into the convertible storage container through the opening 21 in the container. The lid may be detachable. The hi-hat stand 74 and hi-hat pedal 76 are retained in the sleeve 40.

Figure 9:
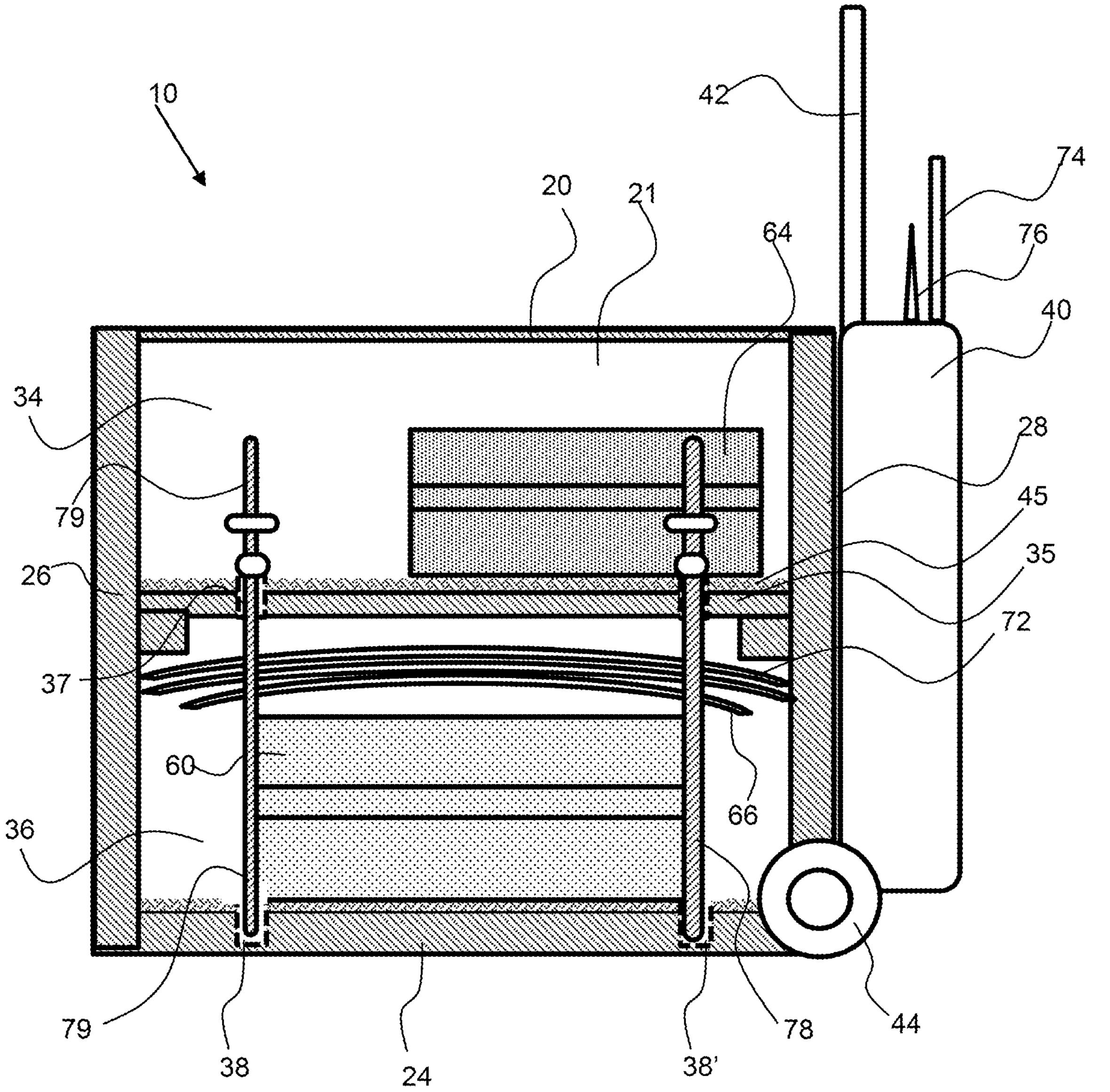
Figure 10:
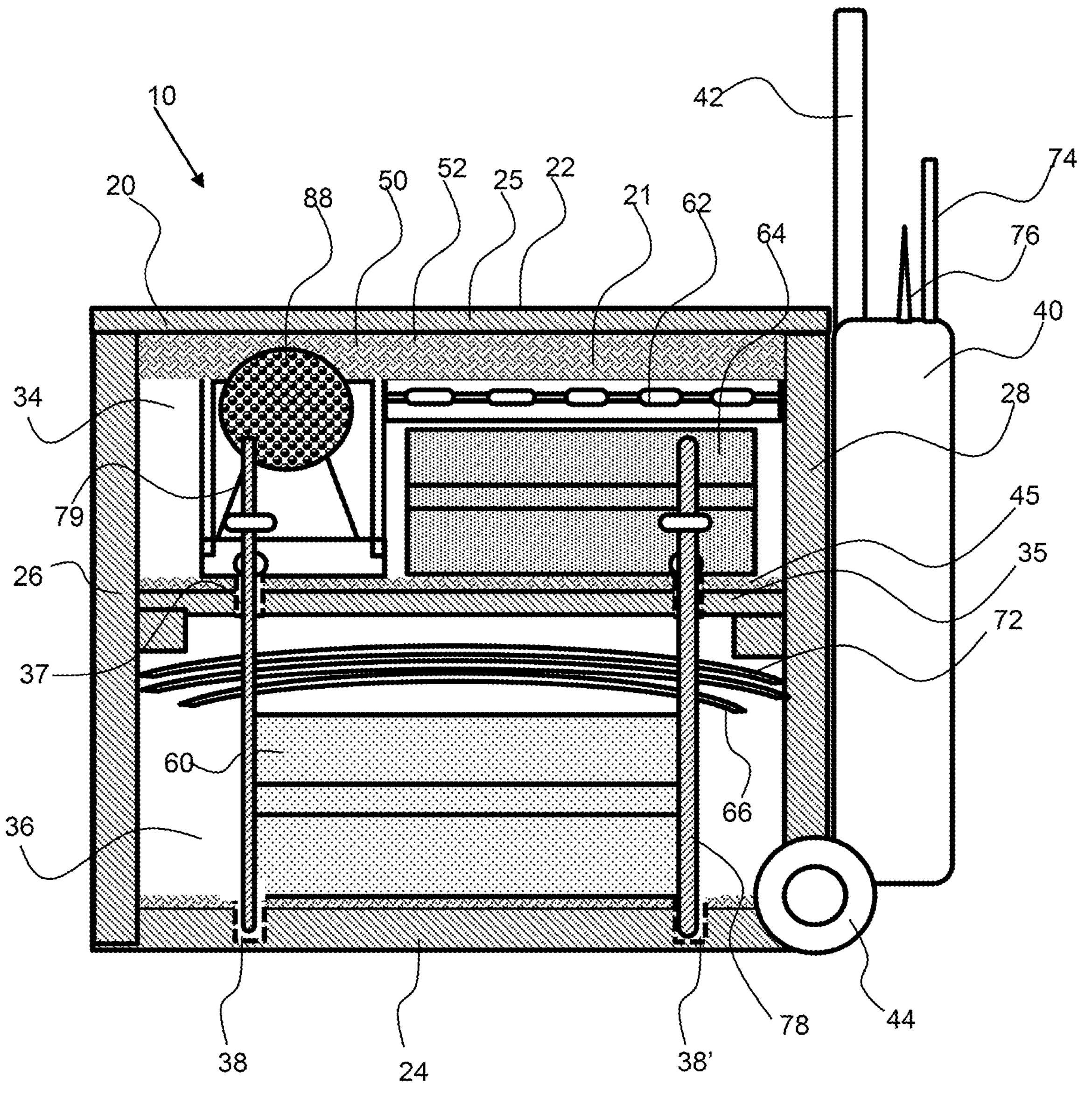

Referring now to FIGS. 9 and 10, the divider 35 is configured between the lower portion 36 and upper portion 34. The divider has apertures 37 to allow the cymbal stand rods 78, 79 to extend through the apertures and down into recess 38 in the base 24 of the convertible storage container. The divider may comprise a non-slip material 45 to prevent components from sliding during transport. As shown in FIG. 9, the tom tom drum 64 is configured in the upper portion 34 and is placed on the non-slip material 45 of the divider 35. As shown in FIG. 10, the cajon pedal 88, tom tom 64 and tambourine 62 are retained in the upper portion 34. The lid is configured with the seat cushion 52 facing inward which may be deformable and may also retain the components therein through compression of the seat cushion.

The cymbals are configured on top of the snare drum and have an interference fit with the interior sides of the exemplary convertible storage container to prevent displacement during transport. The shows cross-sectional views of an exemplary convertible storage container with exemplary drum components configured therein.

Figure 11:
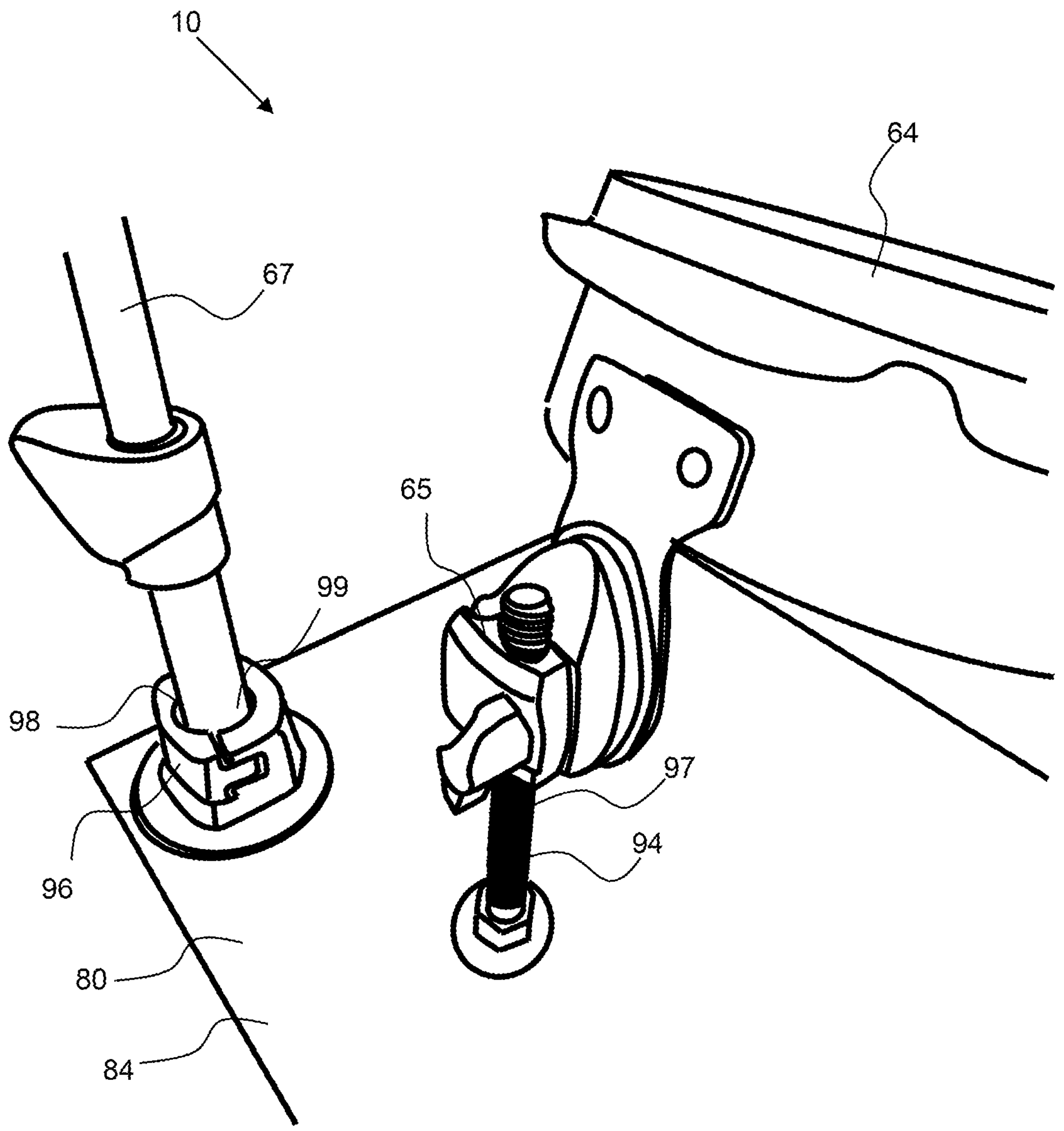
FIG. 11 shows an enlarged view of some of the attachments on the top of the cajon with the instruments attached thereto.

As shown in FIG. 11, the tom tom 64 is attached to the tom tom attachment 94 by an attachment bracket 65 that clamps around the bolt 97 and threads of the attachment 94. The cymbal stand 67 is attached to the cymbal attachment 96 by insertion into the opening 99 of the receiver 98 and then clamping of the receiver 98. Again, the drum components may also attach to the bolts with a drumkey.

Figure 12:
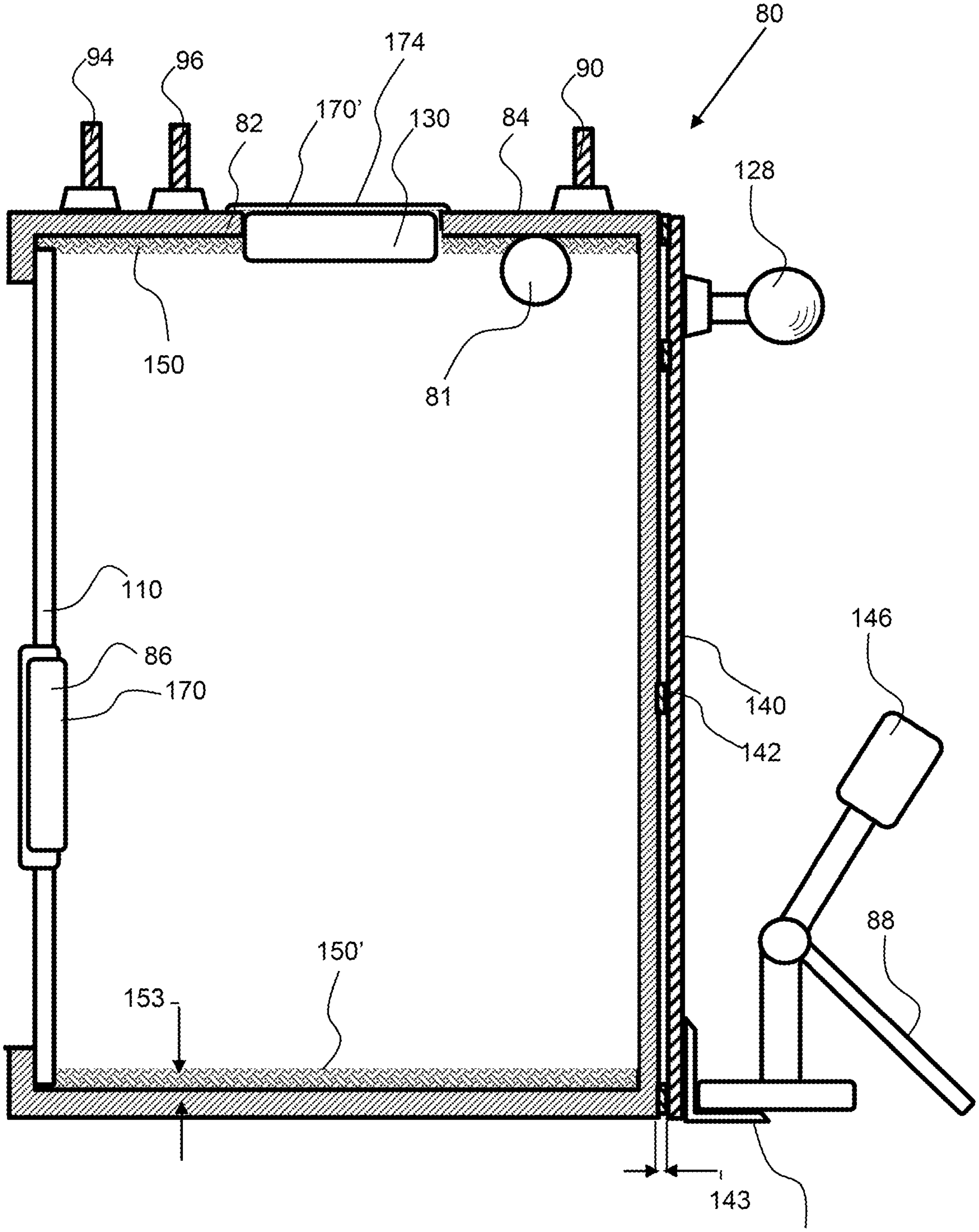
FIG. 12 shows a cross sectional view of an exemplary cajon having sound absorbing material on the interior, a top sound opening, a polymer panel on the front and a batter panel having a spacer gap to enhance vibration and sound.

As shown in FIG. 12, an exemplary cajon 80 has sound absorbing material 150 on the interior surfaces including along the top interior surface, the bottom interior surface and along the side interior surfaces, not shown. The sound absorbing material may also be configured along the back wall and along the front interior surface when a polymer panel 110 is not configured along the front of the cajon. The sound absorbing material may be configured to absorb higher frequency sounds thereby producing a deeper bass sound from the cajon. The sound absorbing material has a thickness 153 which may be effective to absorb mid range and higher frequencies. The sound opening 130 is configured in the top of the cajon which may enable the drummer to more easily hear the sound produced by the cajon. The front of the cajon is configured with a polymer panel, such as polycarbonate, which may be translucent or transparent to allow light to pass therethrough. A light 81 is configured inside, or in the interior of the cajon and may be configured to flash with the beat produced by the cajon. The light produced by the interior light passes through the translucent polymer panel to create a visually appealing effect. A batter panel 140 is configured along the back of the cajon and has a spacer gap 143 produced by the spacers 142. This spacer gap allows the batter panel to vibrate when impacted by the batter 146. This additional vibration produces a richer and deeper bass sound. A cajon handle 128 extends from the back side of the cajon. A sound opening 86 is configured in the front polymer panel 110 of the cajon 80 and a sonic enhancement port 170 is configured in the sound opening.

Figure 13:
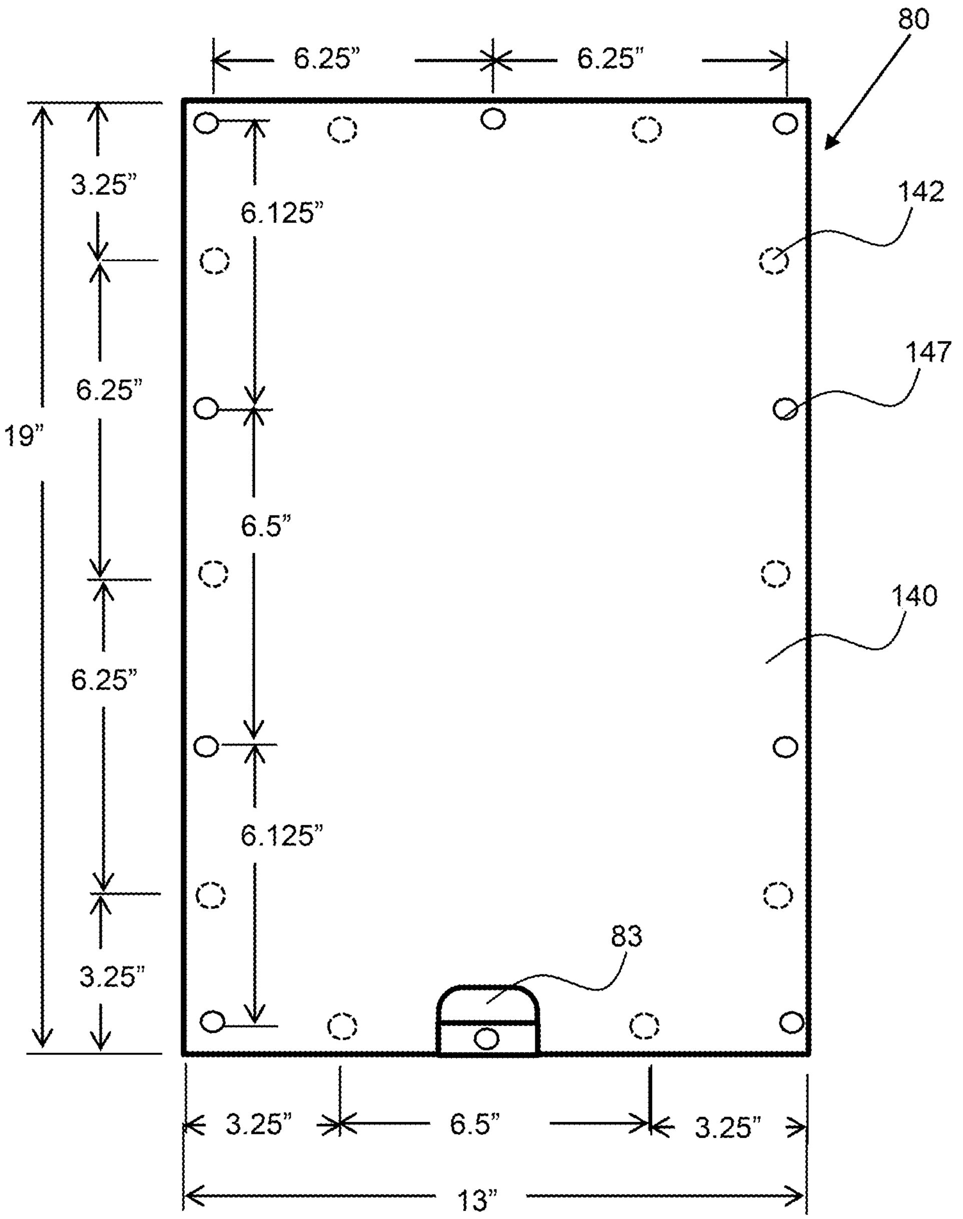
FIG. 13 shows a back view of an exemplary cajon having fasteners with spacers configured between the fasteners.

As shown in FIG. 13, an exemplary cajon 80 has a batter panel 140, such as a maple wood panel coupled to the cajon by batter fasteners 147 and spacers 142 are configured between the fasteners to allow the batter panel to vibrate to produce a richer sound. The batter panel in this exemplary embodiment is an ⅛ thick maple wood panel. The cajon pedal bracket 83 is shown along the bottom of the batter panel of the cajon.

Figure 14:
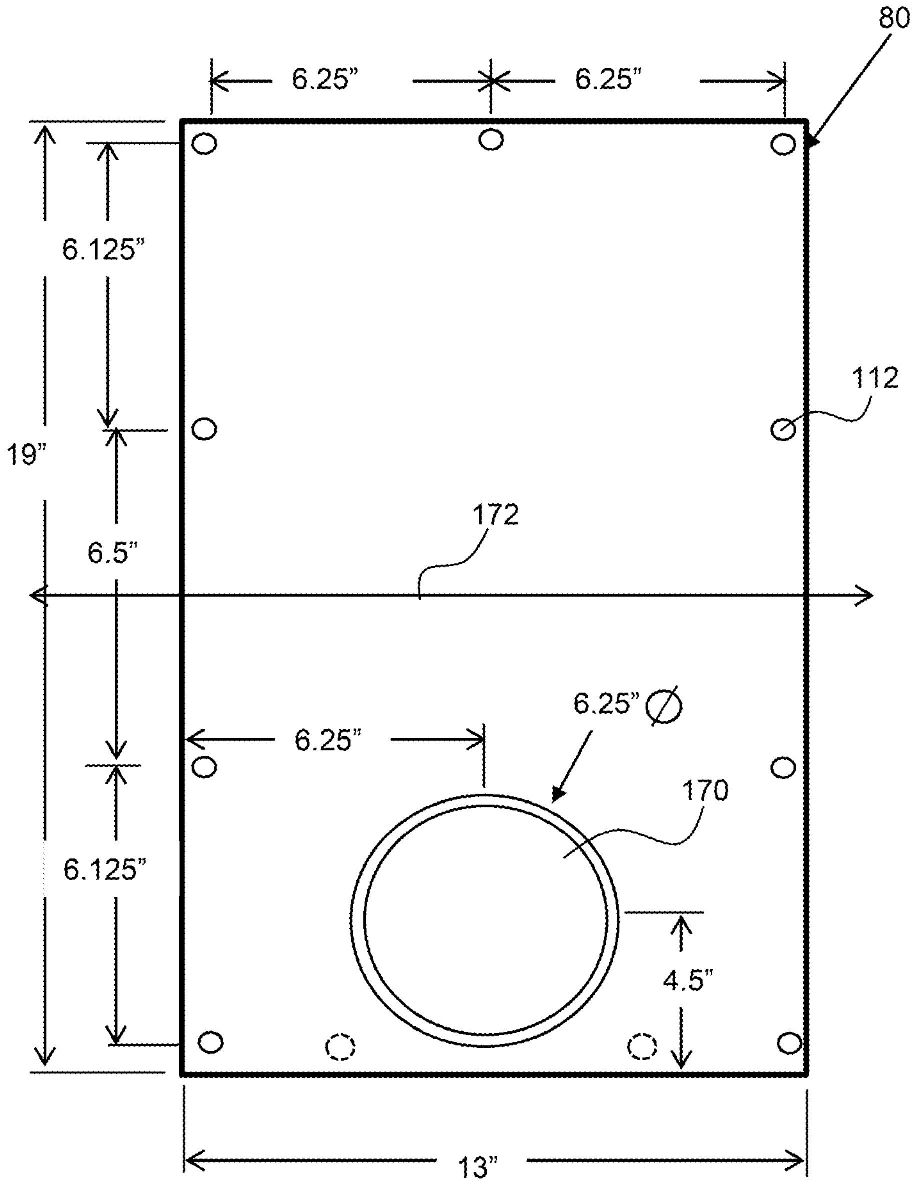
FIG. 14 shows a front view of an exemplary cajon having a sonic enhancement port configured in a polymer panel.

As shown in FIG. 14, an exemplary cajon 80 has sonic enhancement port 170 configured in a polymer panel, such as a 3/32 inch thick Poly(methyl methacrylate) (PMMA). The polymer panel is secured to the cajon with fasteners 112 having a fastener gap distance as shown. As described herein, the fastener gap distance may allow the polymer panel to vibrate and allow air to escape from between the fasteners. The sonic enhancement port is configured in the bottom half of the cajon, wherein the center of the sonic enhancement port is spaced 4.5" from the bottom of the cajon. As described herein the location of the sound opening in the front panel and sonic enhancement port may preferably be located with the bottom half of the cajon, wherein the center point is below center height 172 of the cajon and preferably wherein the entire sound opening or sonic enhancement port is below the center height of the cajon.

Figure 15:
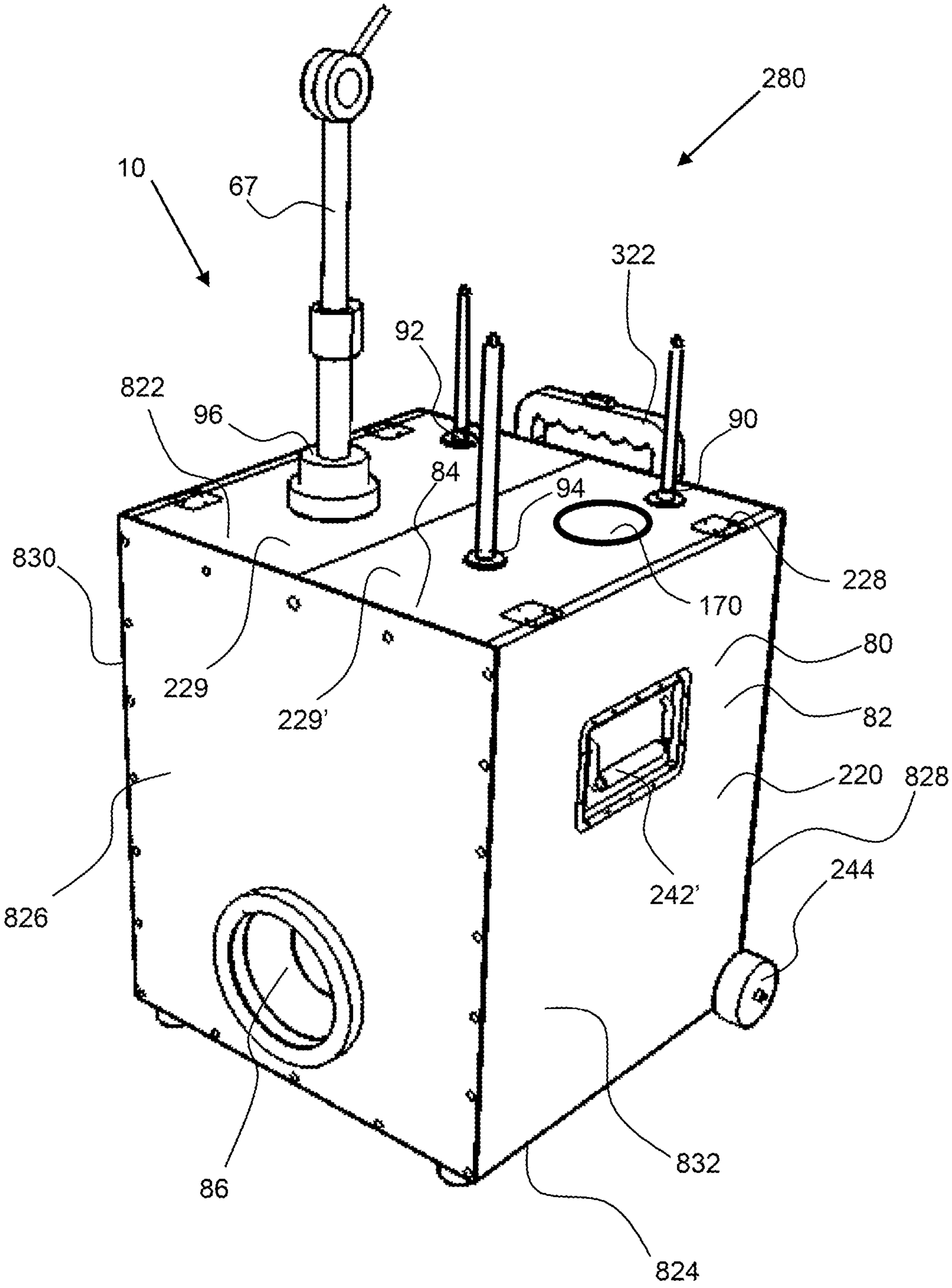
FIG. 15 shows an exemplary portable drum kit system in a transport configuration comprising a convertible cajon that is both a storage container having wheels and a handle and a cajon configured for the attachment of a plurality of drum components.
Figure 16:
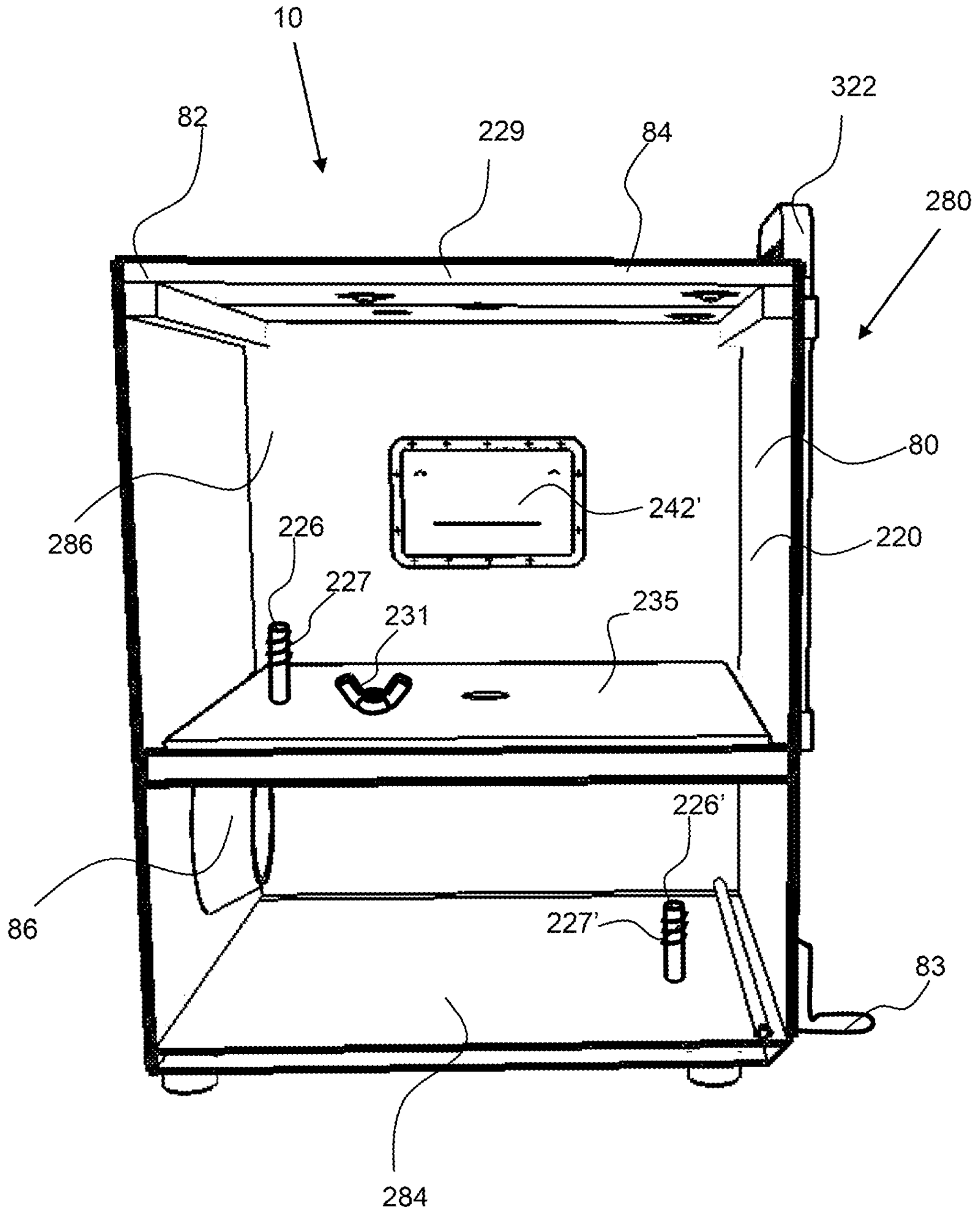
FIG. 16 shows a perspective cross sectional view of the exemplary portable drum convertible cajon shown in FIG. 15 having a removable divider configured between an upper compartment and a lower compartment.
Figure 17:
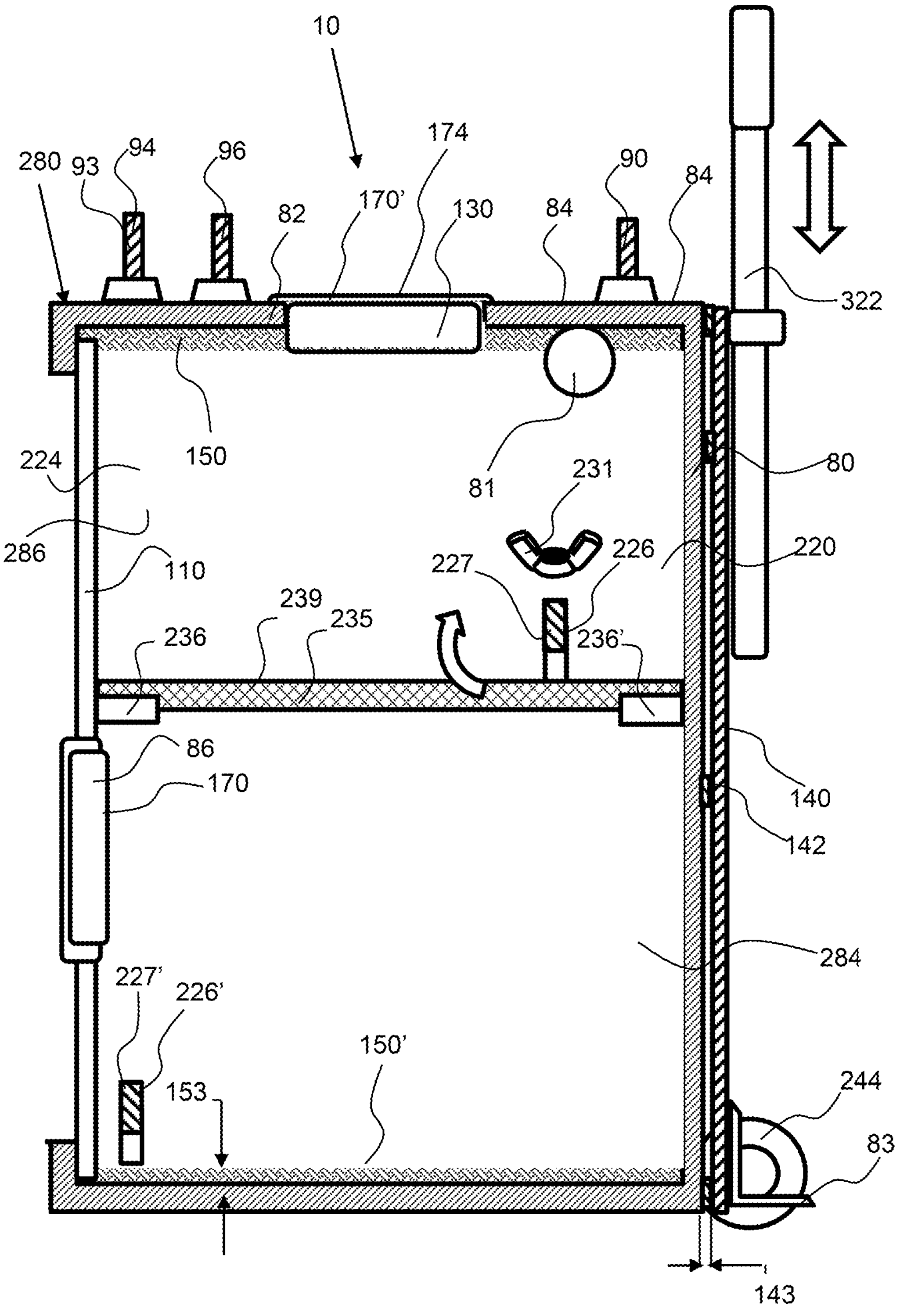
FIG. 17 shows a cross sectional view of an exemplary portable drum kit system comprising a convertible cajon having a removable divider configured between an upper compartment and a lower compartment.

Referring now to FIGS. 15 to 22, an exemplary portable drum kit system 10 may comprise a convertible cajon 280 that is both a storage container 220 and a cajon 80. The convertible cajon has an interior within the cajon enclosure 82 for the storage of other items including other items of the portable drum kit system as described herein which may include, attachments, such as the snare drum attachment, tambourine attachment 92, tom tom attachment 94, and/or symbol attachment 96, as shown in FIG. 2, the cajon pedal 88 and batter 146 as shown in FIG. 15, the snare drum 60, tambourine 62, tom tom 64 cymbal 66 or cymbal stand 67 as shown in FIG. 4, or any other accessories or components described herein, including drum sticks 55, as shown in FIG. 3. The components may be stored in the cajon enclosure as shown in FIG. 10. As shown in FIGS. 16 and 17, the interior of the convertible cajon may have a divider 235 that forms an upper compartment 286 and a lower compartment 284 of the enclosure 82. Note that the divider may rest on brackets 236, 236' to enable the divider to be removed from the enclosure. The divider may be air permeable and may be a screen material 239, such as a metal or fabric or polymer screen, grate or netting material that enables air to pass therethrough, thereby not detracting from the sound the cajon produces. The components may be located in and retrieved from the interior of the cajon by opening the doors 229, 229' that open by rotating about hinges 228. This provides quick access to the components stored therein. Note that the door 229 may be a panel that is detached from the cajon, such as being removed from the top of the cajon.

As shown in FIGS. 16 and 17, interior retainers 226, 226' may be configured in the interior 224 of the storage container 220 or cajon 80 to enable drum components to be detachably attached and securely retained within the container. As shown, a first interior retainer 226 is configured in the upper compartment 286 and a second interior retainer 226' is configured in the lower compartment 284. The interior retainers 226, 226' may have a threaded portion 227, 227' respectively, for receiving a locking component 231, such as a wing nut having a threaded portion that interfaces with the threaded portion of the interior retainer. The locking component may be tightened down onto the threaded portion of the interior retainer to prevent a drum component detachably attached thereto from getting dislodged from the interior retainer. Note that the locking component may have a threaded component that is configured to secure the drum component to the drum component attachment, such as the snare drum attachment 90, tambourine attachment 92, tom tom attachment 94 and cymbal attachment 96.

The convertible cajon forms the transportable storage container having an enclosure formed by the cajon panels along the front 826, back 828, left side 830, right side 832, top 822 and base 824 or bottom of the cajon. The convertible cajon is a transportable storage container having wheels 244 that can engage with the ground when the cajon is tilted back toward the wheels, such as by the retractable handle 322. The retractable handle may be extended upward to provide better leverage for transporting the convertible cajon. The convertible cajon may also have other handles 242, 242' such as on the left and or right sides of the cajon enclosure 82.

The convertible cajon is also a cajon having a sound opening 86, such as on the front and may comprise a sonic enhancement port 170 which may be configured in the top. The cajon storage container 82 may be configured with a cajon pedal bracket 83 for the attachment of a cajon pedal 88 and batter 146 as shown in FIG. 12. The convertible cajon may have all of the same attachments as shown and described herein for FIGS. 1 to 14 including, the snare drum attachment, tambourine attachment 92, tom tom attachment 94, and/or symbol attachment 96, for the respective attachment of the snare drum 60, tambourine 62, tom tom 64 cymbal 66 or cymbal stand 67 as shown in FIG. 4.

The convertible cajon 280 may be played as described herein and may have a spacer 142 and spacer gap 143 on a back side for improved sound quality as described herein, as well as sound absorbing material 150 and a light 81 for enhanced effects. The convertible cajon enables a single enclosure to substantially all of the components attached to the cajon 80 as shown in FIG. 4, except for a large cymbal which may be too large for the enclosure.

FIG. 16 is a right side view of an exemplary convertible cajon 280. The right side may be detachable to enable quick loading and unloading of the drum components into the enclosure of the convertible cajon. The right side may be retained by brackets or other fasteners.

Figure 18:
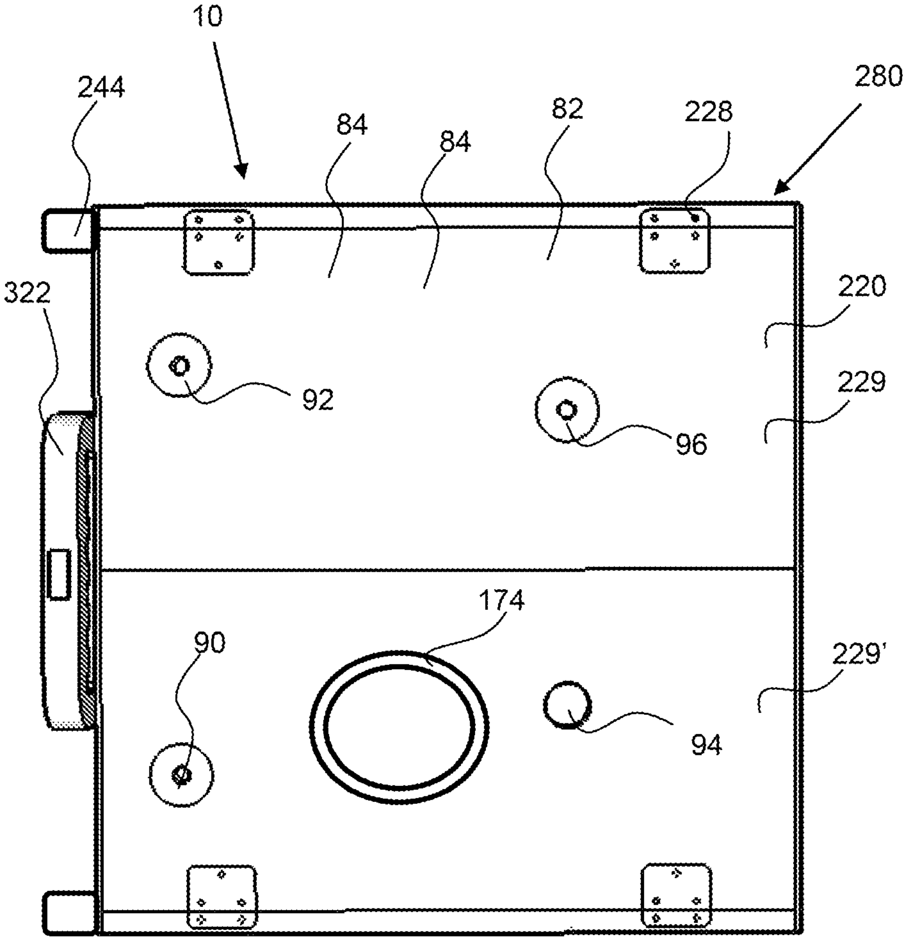
FIG. 18 show a top view of an exemplary portable drum kit system comprising a convertible cajon that is a storage container and a cajon 80.

As shown in FIG. 18, the convertible cajon has a pair of doors 229, 229' that are configured to open to provide access into the interior of the convertible cajon enclosure. The doors are hinged to the convertible cajon 280 by hinges 228. The pair of doors open to produce a substantial opening on the top, wherein the opening area is at least 75% or more of the surface area of the top of the convertible cajon.

Figure 19:
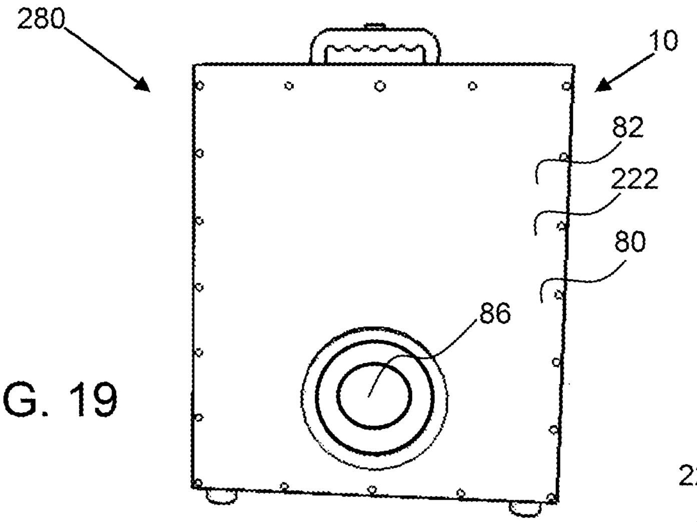
FIG. 19 shows a front view of an exemplary portable drum kit system comprising a convertible cajon that is a storage container and a cajon 80.
Figure 20:
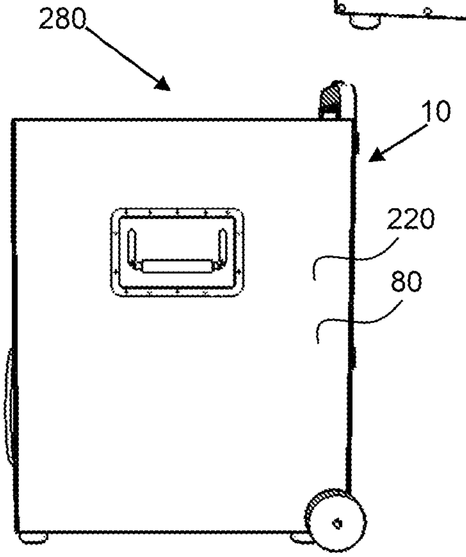
FIG. 20 shows a right side view of an exemplary portable drum kit system comprising a convertible cajon that is a storage container and a cajon 80.
Figure 21:
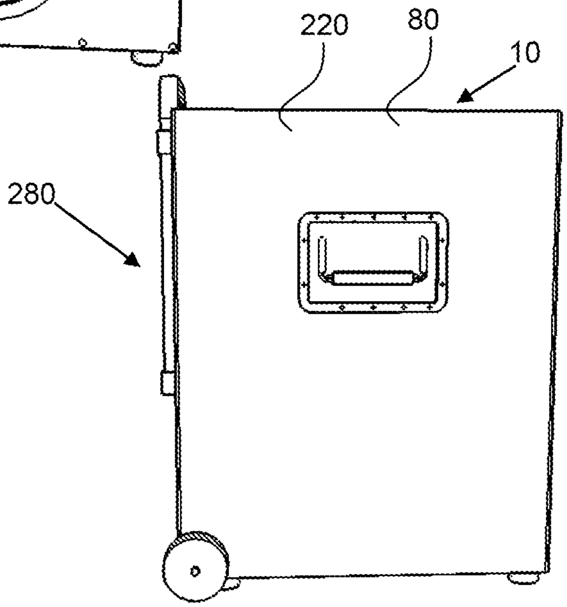
FIG. 21 shows a left side view of an exemplary portable drum kit system comprising a convertible cajon that is a storage container and a cajon 80.
Figure 22:
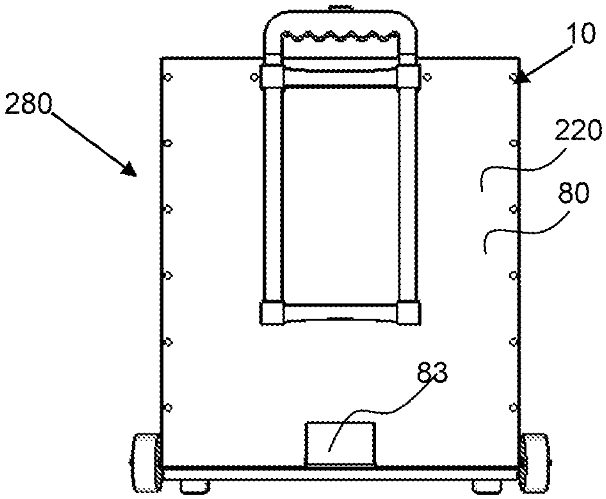
FIG. 22 shows a back view of an exemplary portable drum kit system comprising a convertible cajon that is a storage container and a cajon 80.

As shown in FIGS. 19, the convertible cajon has a front side, FIG. 19, a right side, FIG. 20, a left side, FIG. 21 and a back side FIG. 22. As described herein, any of these sides, or faces may have a door for access into the interior of the convertible cajon enclosure. The door may be substantially the entire side or face, or at least 75% of the area of that side.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A portable drum kit system comprising a portable drum kit comprising:

a) a convertible cajon that converts from a storage container to a cajon, wherein the convertible cajon comprises:

i) an enclosure having an opening to provide access to an interior of said convertible cajon;

ii) a pair of wheels;

iii) a handle;

iv) a cajon pedal;

v) a sound opening;

vi) a plurality of drum component attachments comprising:

a snare attachment extending from said top;

a tambourine attachment extending from said top;

a tom tom attachment extending from said top; and a cymbal attachment extending from said top;

b) a plurality of drum components comprising:

i) a snare drum;

ii) a tambourine;

iii) a tom tom; and iv) a cymbal;

wherein, in a transport configuration, the snare drum, cymbal, cajon pedal, tambourine and tom tom are configured in said interior of the cajon;

wherein, in a drumming configuration, the snare drum is detachable attached to the snare attachment, the tambourine is detachably attached to the tambourine attachment, the tom tom is detachably attached to the tom tom attachment and the cymbal is detachably attached to the cymbal attachment.

2. The portable drum kit system of claim 1, wherein the enclosure of the convertible cajon is formed by a top, a bottom, a front, a back, a left-side panel and a right-side panel, and wherein the opening to provide access to said interior of the convertible cajon is in at least one of said top, front, back, left-side and right-side.

3. The portable drum kit system of claim 1, wherein the opening is in said top.

4. The portable drum kit system of claim 1, wherein the convertible cajon further comprises a door configured to open to produce said opening to provide access to an interior of the convertible cajon.

5. The portable drum kit system of claim 4, wherein the door is configured in the top of the convertible cajon.

6. The portable drum kit system of claim 1, wherein at least a portion of the drum component attachments comprise a threaded portion.

7. The portable drum kit system of claim 6, comprising a locking component configured to screw down onto the threaded portion.

8. The portable drum kit system of claim 6, further comprising an interior attachment configured within the interior of the enclosure and configured to retain one of the drum components, said interior attachment comprising a threaded portion, wherein the locking component is configured to screw down onto the threaded portion of the interior attachment.

9. The portable drum kit system of claim 1, further comprising a divider that is configured within the interior of the convertible cajon to produce an upper compartment and a lower compartment.

10. The portable drum kit system of claim 9, wherein the divider is detachably attachable.

11. The portable drum kit system of claim 10, further comprising a first interior attachment configured in the upper compartment and a second interior attachment configured in the lower compartment.

12. The portable drum kit system of claim 10, wherein at least a portion of the drum component attachments comprise a threaded portion; and further comprising:

a locking component configured to screw down onto the threaded portion, both of said first interior attachment and second interior attachment comprising a threaded portion, wherein the locking component is configured to screw down onto said threaded portion of the first and second interior attachments.

13. The portable drum kit system of claim 1, wherein the tambourine attachment, the tom tom attachment and snare attachment comprise a threaded bolt attachment.

14. The portable drum kit system of claim 1, wherein the pair of wheels extend from a back of the cajon and are configured to engage the ground when the convertible cajon is tilted toward said pair of wheels.

15. The portable drum kit system of claim 14, wherein the handle is a retractable handle that is configured to extend up from a top of the convertible cajon to enable the convertible cajon to be tilted toward the pair of wheels.

16. The portable drum kit system of claim 1, wherein the convertible cajon comprises a polymer panel along a front of the cajon and wherein the sound opening is configured in the polymer panel.

17. The portable drum kit system of claim 16, wherein the polymer panel is translucent, and further comprising a light configured in an interior of the cajon enclosure.

18. The portable drum kit system of claim 17, wherein the light is configured to flash with a sound produced by the convertible cajon.

19. The portable drum kit system of claim 1, wherein the sound opening is in a front of the cajon.

20. The portable drum kit system of claim 19, wherein the sound opening extends along a bottom of the front of the cajon.

* * * * *